United States Patent
SenGupta et al.

(10) Patent No.: US 12,108,760 B2
(45) Date of Patent: Oct. 8, 2024

(54) HERBICIDAL COMPOSITIONS

(71) Applicant: Monsanto Technology LLC, St. Louis, MO (US)

(72) Inventors: Ashoke K. SenGupta, Wentzville, MO (US); Thimmareddy Thatiparti, Chesterfield, MO (US); Junhua Zhang, Chesterfield, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 877 days.

(21) Appl. No.: 16/962,895

(22) PCT Filed: Dec. 28, 2018

(86) PCT No.: PCT/US2018/067802
§ 371 (c)(1),
(2) Date: Jul. 17, 2020

(87) PCT Pub. No.: WO2019/143455
PCT Pub. Date: Jul. 25, 2019

(65) Prior Publication Data
US 2021/0059248 A1    Mar. 4, 2021

Related U.S. Application Data

(60) Provisional application No. 62/618,485, filed on Jan. 17, 2018.

(51) Int. Cl.
| | |
|---|---|
| *A01N 25/28* | (2006.01) |
| *A01N 25/30* | (2006.01) |
| *A01N 25/32* | (2006.01) |
| *A01N 37/26* | (2006.01) |
| *A01N 37/40* | (2006.01) |

(52) U.S. Cl.
CPC ............ *A01N 25/28* (2013.01); *A01N 25/30* (2013.01); *A01N 25/32* (2013.01); *A01N 37/26* (2013.01); *A01N 37/40* (2013.01)

(58) Field of Classification Search
CPC ........ A01N 25/04; A01N 25/28; A01N 25/30; A01N 25/32; A01N 37/26; A01N 37/40; A01N 57/20; A01P 13/02
USPC ........................................... 504/142
See application file for complete search history.

(56) References Cited

U.S. PATENT DOCUMENTS

| | | |
|---|---|---|
| 5,201,933 A | 4/1993 | Miller et al. |
| 5,925,595 A | 7/1999 | Seitz et al. |
| 10,638,751 B2 * | 5/2020 | Zhang ............... A01N 41/10 |
| 2004/0137031 A1 | 7/2004 | Seitz et al. |
| 2010/0248963 A1 | 9/2010 | Becher et al. |
| 2011/0251064 A1 | 10/2011 | Cannan et al. |
| 2012/0129694 A1 | 5/2012 | Ditmarsen et al. |
| 2012/0184434 A1 * | 7/2012 | Xu ................. A01N 39/04 544/402 |
| 2013/0029847 A1 | 1/2013 | Findley et al. |
| 2014/0128264 A1 | 5/2014 | Hemminghaus et al. |
| 2015/0264924 A1 | 9/2015 | Hemminghaus et al. |
| 2016/0192645 A1 * | 7/2016 | Zhang ............... A01N 41/10 504/144 |

FOREIGN PATENT DOCUMENTS

| | | | |
|---|---|---|---|
| CN | 1433685 A | 8/2003 | |
| EP | 3112016 A1 * | 1/2017 | ............. B01J 13/16 |

OTHER PUBLICATIONS

Singh, B., et al., "Probing the Retention Mechanism of the Flare Mixed-Mode Column at Low pH via Acidic Herbicides with Different pKa Values," Diamond Analytics Application Note: DA1000-C, Not Dated, 3 pages.

International Search Report and Written Opinion issued in PCT/US2018/67802, dated Mar. 25, 2019, 10 pages.

3 International Preliminary Report on Patentability issued ssued in PCT/US2018/67802, dated Jul. 30, 2020, 8 pages.

CLARITY Herbicide Product Information Sheet, EPA Reg. No. 7969-137, BASF Corporation, 26 Davis Drive, Research Triangle Park, NC 27709, 2010, 22 pages.

* cited by examiner

*Primary Examiner* — Michael G. Hartley
*Assistant Examiner* — Danielle Johnson
(74) *Attorney, Agent, or Firm* — Harness, Dickey & Pierce, P.L.C.

(57) ABSTRACT

The present invention generally relates to herbicidal compositions such as aqueous herbicidal concentrate compositions and application mixtures. For example, the present invention relates to aqueous herbicidal concentrate compositions comprising an encapsulated acetamide herbicide and a second, unencapsulated herbicide. The present invention also relates to various processes for preparing and using these herbicidal compositions. The present invention further relates to herbicidal concentrate compositions having a high loading of an auxin herbicide and methods of preparing these concentrate compositions.

19 Claims, No Drawings

HERBICIDAL COMPOSITIONS

REFERENCE TO RELATED APPLICATIONS

The present application is the 371 National Stage Application of International Patent Application Serial No. PCT/US2018/067802, filed Dec. 28, 2018, which claims the benefit of U.S. Provisional Application Ser. No. 62/618,485, filed Jan. 17, 2017, the entire contents of which are incorporated herein by reference.

FIELD OF THE INVENTION

The present invention generally relates to herbicidal compositions such as aqueous herbicidal concentrate compositions and application mixtures. For example, the present invention relates to aqueous herbicidal concentrate compositions comprising an encapsulated acetamide herbicide and a second, unencapsulated herbicide. The present invention also relates to various processes for preparing and using these herbicidal compositions. The present invention further relates to herbicidal concentrate compositions having a high loading of an auxin herbicide and methods of preparing these concentrate compositions.

BACKGROUND OF THE INVENTION

The emergence of certain herbicide resistant weeds has generated interest in developing strategies to supplement the action of primary herbicides such as glyphosate. Herbicidal compositions containing a combination of active ingredients having different modes of action are especially suited for supplementing primary herbicides and controlling growth of unwanted plants, including those with selected herbicide resistance. Herbicidal concentrate compositions containing high loadings of these multiple active ingredients (i.e., pre-mix concentrates) are beneficial because they are economical to transport and store and are especially convenient to formulate in the field.

Synthetic auxin herbicides, such as dicamba and 2,4-D, are one class of highly effective herbicides that have a different mode of action than glyphosate. Auxin herbicides mimic or act like natural auxin plant growth regulators. Auxin herbicides appear to affect cell wall plasticity and nucleic acid metabolism, which can lead to uncontrolled cell division and growth. The injury symptoms caused by auxin herbicides include epinastic bending and twisting of stems and petioles, leaf cupping and curling, and abnormal leaf shape and venation.

Another class of herbicides that can supplement the action of primary herbicides are acetamide herbicides. These herbicides are effective residual control herbicides that reduce early season weed competition. In particular, acetamide herbicides such as acetochlor provide outstanding residual control of many grasses and broadleaf weeds including pigweed, waterhemp, lambsquarters, nightshade, foxtails, among others. Acetamides are generally classified as seedling growth inhibitors. Seedling growth inhibitors are absorbed and translocated in plants from germination to emergence primarily by subsurface emerging shoots and/or seedling roots. Acetamide herbicides typically do not offer significant post-emergence activity, but as a residual herbicide provide control of newly emerging monocots and small-seeded dicot weed species. This supplements the activity of post-emergence herbicides that may lack significant residual activity.

Acetamide herbicides can be microencapsulated to modulate release properties. Methods for producing microencapsulated acetamides are described in various patents and publications including U.S. Pat. No. 5,925,595; U.S. Publication No. 2004/0137031; and U.S. Publication No. 2010/0248963. Generally, to form microcapsules, the herbicide is encapsulated in a polymeric shell wall material. The herbicide is released from the microcapsules at least in part by molecular diffusion through the shell wall. Several factors including the type of herbicide, type of polymer, shell thickness, shell porosity, particle size, and presence of safeners can impact the rate of release of the herbicide from the microcapsules and/or crop safety associated with the microcapsules.

Addressing the need for herbicidal concentrate compositions containing microencapsulated acetamide herbicides in combination with other actives such as auxin herbicides has been challenging. The release properties of microencapsulated acetamide herbicides can be sensitive to the inclusion of other ingredients in the compositions. The ingredients must be compatible with the shell wall material such that the microcapsules exhibit stability over a wide range of storage conditions. Also, the composition needs to be stable against compositional changes due to chemical degradation of ingredients. Thus, there remains a need for formulation strategies to provide for stable concentrate compositions in which the release properties and bioavailability of the herbicides are not significantly compromised.

BRIEF SUMMARY OF THE INVENTION

Various aspects of the present invention are directed to aqueous herbicidal concentrate compositions comprising:
- (a) microcapsules dispersed in an aqueous liquid medium wherein the microcapsules comprise a core material comprising an acetamide herbicide and a polyurea shell wall encapsulating the core material, wherein the acetamide herbicide concentration in the composition on an active ingredient basis is at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. %, and
- (b) an auxin herbicide component comprising an anion of an auxin herbicide and a salt-forming cation, wherein the auxin herbicide concentration in the composition on an acid equivalent basis is at least about 1 wt. %, at least about 5 wt. %, or at least about 10 wt. %, and wherein the composition satisfies one or more of the following conditions:
  - (i) a pH that is no greater than about 4.5, no greater than about 4.0, no greater than about 3.8, no greater than about 3.5, or no greater than about 3.3;
  - (ii) a molar ratio of the salt-forming cation to the anion of the auxin herbicide that is no greater than about 0.8:1, no greater than about 0.75:1, no greater than about 0.7:1, no greater than about 0.65:1, no greater than about 0.6:1, no greater than about 0.55:1, no greater than about 0.5:1, no greater than about 0.45:1, no greater than about 0.4:1, no greater than about 0.35:1, no greater than about 0.3:1, no greater than about 0.25:1, or no greater than about 0.2:1;
  - (iii) the composition further comprises an emulsifier comprising an anionic surfactant comprising a strong or mineral acid functionality; an amphoteric surfactant comprising a strong or mineral acid functionality; and/ or a nonionic surfactant having a molecular weight of at least about 1,000 Da, at least about 2,000 Da, at least about 5,000 Da, or at least about 10,000 Da;

(iv) the composition further comprises ferric sulfate;

(v) the composition further comprises an alkylene glycol; and/or (vi) the composition further comprises a volatility control additive comprising a monocarboxylic acid and/or salt thereof.

Other aspects of the present invention are directed to aqueous herbicidal concentrate compositions comprising:

an auxin herbicide component comprising an anion of an auxin herbicide and a salt-forming cation, wherein the auxin herbicide concentration in the composition on an acid equivalent basis is at least about 5 wt. %, or at least about 10 wt. %; and a volatility control additive comprising a monocarboxylic acid and/or salt thereof, wherein the herbicidal concentrate composition has a pH that is no greater than about 4.5, no greater than about 4.0, no greater than about 3.8, no greater than about 3.5, or no greater than about 3.3 and/or has a molar ratio of the salt-forming cation to the anion of the auxin herbicide that is no greater than about 0.8:1, no greater than about 0.75:1, no greater than about 0.7:1, no greater than about 0.65:1, no greater than about 0.6:1, no greater than about 0.55:1, no greater than about 0.5:1, no greater than about 0.45:1, no greater than about 0.4:1, no greater than about 0.35:1, no greater than about 0.3:1, no greater than about 0.25:1, or no greater than about 0.2:1.

Further aspects of the present invention are directed to methods for controlling weeds in a field. The methods comprise mixing water with an aqueous herbicidal concentrate composition as described herein to form an application mixture; and applying the application mixture to the field in a herbicidally effective amount.

Other objects and features will be in part apparent and in part pointed out hereinafter.

DETAILED DESCRIPTION OF THE INVENTION

Generally, the present invention relates to herbicidal compositions such as aqueous herbicidal concentrate compositions and application mixtures. Various embodiments of the present invention relate to aqueous herbicidal concentrate compositions and application mixtures comprising an encapsulated acetamide herbicide and an auxin herbicide. For example, some embodiments are directed to various aqueous herbicidal concentrate compositions comprising (a) microcapsules dispersed in an aqueous liquid medium wherein the microcapsules comprise a core material comprising an acetamide herbicide and a polyurea shell wall encapsulating the core material, wherein the acetamide herbicide concentration in the composition on an active ingredient basis is at least about 10 wt. %, and (b) an auxin herbicide component comprising an anion of an auxin herbicide and a salt-forming cation, wherein the auxin herbicide concentration in the composition on an acid equivalent basis is at least about 1 wt. %. Other embodiments of the present invention also relates to various processes for preparing and methods of using these herbicidal compositions.

It has been discovered that under certain conditions and circumstances herbicidal concentrate compositions containing microcapsules of acetamide herbicides (e.g., acetochlor) and auxin herbicides such as dicamba can exhibit a decrease in herbicide content over prolonged storage conditions. It is theorized that the decrease in herbicide content is at least partially caused by a reaction of certain forms of the auxin herbicide with the microcapsules of acetamide herbicide. Applicants have discovered a series of effective strategies to chemically stabilize these compositions to reduce or eliminate progressive loss of the herbicide content (e.g., via decomposition or degradation reactions). Accordingly, various aspects of the present invention are directed to herbicidal compositions having improved chemical stability as well as methods of preparing these compositions, which employ one or more of the strategies discovered by applicants as described herein.

Other aspects of the present invention are directed to storage stable herbicidal compositions comprising a microencapsulated acetamide herbicide and auxin herbicide that exhibit reduced auxin herbicide volatility. In addition to having improved stability, these compositions provide for reduced vaporization and migration of the auxin herbicide from the application site to adjacent crop plants where contact damage to sensitive plants can occur.

Further aspects of the present invention provide for concentrated herbicidal compositions comprising at least one microencapsulated acetamide herbicide and at least one auxin herbicide that can be diluted to provide an effective spray formulation solution. Highly concentrated compositions reduce the volume of the liquid and associated packaging that would otherwise be required for more dilute compositions. The smaller volume reduces space required to store and transport the concentrate composition prior to sale or use. Further, a highly concentrated herbicidal composition containing both an acetamide herbicide and auxin herbicide is convenient for agricultural workers to formulate as spray solutions and avoids the risk of tank mixing errors.

Additional aspects of the present invention include herbicidal concentrate compositions having a high loading of an auxin herbicide that can exhibit reduced auxin herbicide volatility at relatively low pH. These compositions are especially useful when formulating compositions that benefit from low formulation pH (e.g., compositions that exhibit improved chemical stability at low formulation pH).

I. Herbicidal Compositions Containing a Microencapsulated Acetamide Herbicide and Auxin Herbicide Various embodiments of the present invention are directed to herbicidal compositions comprising (a) microcapsules dispersed in an aqueous liquid medium (e.g., water) wherein the microcapsules comprise a core material comprising an acetamide herbicide and a shell wall encapsulating the core material, and (b) an auxin herbicide component comprising an anion of an auxin herbicide and a salt-forming cation.

The herbicide loading in the herbicidal compositions can range depending on the form of the compositions (i.e., concentrate or dilute application mixture). Generally, the total herbicide loading in the herbicidal compositions ranges from about 1% to about 60% or from about 1% to about 50% by weight on an active ingredient basis, such as 5%, 10%, 15%, 20%, 25%, 30%, 35%, 40%, 45%, 50%, 60%, or ranges between these percentages, by weight on an active ingredient basis. In various embodiments, the herbicidal composition is an aqueous herbicidal concentrate composition that contains at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % of the acetamide herbicide on an active ingredient basis. In these and other embodiments, the acetamide herbicide concentration on an active ingredient basis is from about 10 wt. % to about 65 wt. %, from about 10 wt. % to about 60 wt. %, from about 10 wt. % to about 50 wt. %, from about 10 wt. % to about 40 wt. %, from about 10 wt. % to about 30 wt. %, from about 15 wt. % to about 65 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 65 wt. %, from about 20 wt. % to about 60 wt. %, from about 20 wt. % to about 50 wt. %, from about 20 wt. % to about 40 wt. %, from about 20 wt. % to about 35 wt. %, from about 20 wt. % to about 30 wt. %, from about 25 wt. % to about 65 wt. %, from about 25 wt. % to about 60 wt. %, from about 25 wt. % to about 50 wt. %, from about 25 wt. % to about 40 wt. %, from about 25 wt. % to about 35 wt. %, from about 30 wt. % to about 65 wt. %, from about 30 wt. % to about 60 wt. %, from about 30 wt. % to about 50 wt. %, from about 30 wt. % to about 40 wt. %, or from about 30 wt. % to about 35 wt. %.

In various aqueous herbicidal concentrate compositions, the auxin herbicide concentration on an acid equivalent basis is at least about 1 wt. %, at least about 5 wt. %, or at least 10 wt. %. For example, the auxin herbicide concentration on an acid equivalent basis can be from about 1 wt. % to about 30 wt. %, from about 2 wt. % to about 30 wt. %, from about 5 wt. % to about 30 wt. %, from about 10 wt. % to about 30 wt. %, from about 15 wt. % to about 30 wt. %, from about 1 wt. % to about 20 wt. %, from about 2 wt. % to about 20 wt. %, from about 5 wt. % to about 20 wt. %, from about 10 wt. % to about 20 wt. %, from about 1 wt. % to about 15 wt. %, from about 2 wt. % to about 15 wt. %, from about 5 wt. % to about 15 wt. %, from about 10 wt. % to about 15 wt. %, from about 1 wt. % to about 10 wt. %, from about 2 wt. % to about 10 wt. %, or from about 5 wt. % to about 10 wt. %.

In other embodiments, the herbicidal compositions are application mixtures. The total herbicide loading in the application mixtures is typically no more than about 5% by weight or from about 0.1% to about 5% by weight on an active ingredient basis, such as 5%, 4%, 3%, 2%, 1%, 0.5% or 0.1% by weight on an active ingredient basis.

Also, in various embodiments, the weight ratio of the acetamide herbicide to the auxin herbicide component on an acid equivalent basis can be from about 10:1 to about 1:10, from about 5:1 to about 1:5, from about 5:1 to about 1:4, from about 5:1 to about 1:3, from about 5:1 to about 1:2, from about 5:1 to about 1:1, from about 5:1 to about 1.5:1, from about 3:1 to about 1:4, from about 3:1 to about 1:3, from about 3:1 to about 1:2, from about 3:1 to about 1:1, from about 3:1 to about 1.5:1, from about 2:1 to about 1:4, from about 2:1 to about 1:3, from about 2:1 to about 1:2, from about 2:1 to about 1:1, or from about 2:1 to about 1.5:1.

Microencapsulated Acetamide Herbicide

As noted, the core material comprises an acetamide herbicide. Acetamide herbicides are a group of structurally related herbicides that include acetanilide herbicides (e.g., chloroacetanilide herbicides) and other amide-containing herbicides. Examples of acetamide herbicides suitable for microencapsulation include herbicides such as acetochlor, alachlor, butachlor, butenachlor, delachlor, diethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and combinations thereof. Some acetamide herbicides are available in their free forms, as salts, or as derivatized materials, for example, as esters. In further embodiments, the acetamide herbicide is selected from the group consisting of acetochlor, alachlor, metolachlor, S-metolachlor, dimethenamid, dimethenamid-P, butachlor, stereoisomers thereof, and mixtures thereof. In certain embodiments, the acetamide herbicide is selected from the group consisting of acetochlor, metolachlor S-metolachlor, and mixtures thereof. In some embodiments, the acetamide herbicide comprises acetochlor.

Chloroacetanilide herbicides are one subgroup of acetamide herbicides. In various embodiments, the acetamide herbicide comprises a chloroacetanilide herbicide. In these and other embodiments, the acetamide herbicide comprises at least one chloroacetanilide herbicide selected from the group consisting of acetochlor, alachlor, butachlor, butenachlor, delachlor, diethatyl, dimethachlor, metazochlor, metolachlor, S-metolachlor, pretilachlor, propachlor, propisochlor, prynachlor, terbuchlor, thenylchlor and xylachlor, and mixtures thereof. In some embodiments, the acetamide herbicide comprises at least one chloroacetanilide herbicide selected from the group consisting of the group consisting of acetochlor, alachlor, butachlor, metolachlor, S-metolachlor, stereoisomers thereof, and mixtures thereof.

Typically, the acetamide herbicide constitutes a large percentage of the microcapsule weight. For instance, the acetamide herbicide can constitute at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. % of the microcapsule. In various embodiments, the acetamide herbicide constitutes from about 10 wt. % to about 65 wt. %, from about 10 wt. % to about 60 wt. %, from about 10 wt. % to about 50 wt. %, from about 10 wt. % to about 40 wt. %, from about 10 wt. % to about 30 wt. %, from about 15 wt. % to about 65 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 65 wt. %, from about 20 wt. % to about 60 wt. %, from about 20 wt. % to about 50 wt. %, from about 20 wt. % to about 40 wt. %, from about 20 wt. % to about 35 wt. %, from about 20 wt. % to about 30 wt. %, from about 25 wt. % to about 65 wt. %, from about 25 wt. % to about 60 wt. %, from about 25 wt. % to about 50 wt. %, from about 25 wt. % to about 40 wt. %, from about 25 wt. % to about 35 wt. %, from about 30 wt. % to about 65 wt. %, from about 30 wt. % to about 60 wt. %, from about 30 wt. % to about 50 wt. %, from about 30 wt. % to about 40 wt. %, or from about 30 wt. % to about 35 wt. % of the microcapsule.

The core material can further comprise one or more additives including a safener or diluent (e.g., additional solvent). In some embodiments, the core material comprises a safener. Safeners include, for example, furilazole ((RS)-3-(dichloroacetyl)-5-(2-furanyl)-2,2-dimethyl-1,3-oxazolidine 95%), commercially available from Monsanto Company; AD 67 (4-(dichloroacetyl)-1-oxa-4-azaspiro[4,5]decane); benoxacor (CGA 154281, (RS)-4-dichloroacetyl-3,4-dihydro-3-methyl-2H-1,4-benzoxazine); cloquintocet-mexyl (CGA 184927, (5-chloroquinolin-8-yloxy)acetic acid); cyometrinil (CGA 43089, (Z)-cyanomethoxyimino (phenyl)acetonitrile); cyprosulfamide (N-[4-(cyclopropylcarbamoyl)phenylsulfonyl]-o-anisamide); dichlormid (DDCA, R25788, N,N-diallyl-2,2-dichloroacetamide); dicyclonon ((RS)-1-dichloroacetyl-3,3,8a-trimethylperhydropyrrolo[1,2-a]pyrimidin-6-one); dietholate (O,O-diethyl O-phenyl phosphorothioate) fenchlorazole-ethyl (HOE 70542, 1-(2,4-dichlorophenyl)-5-trichloromethyl-1H-1,2,4-triazole-3-carboxylic acid); fenclorim (CGA 123407 4,6-dichloro-2-phenylpyrimidine); flurazole (benzyl 2-chloro-4- trifluoromethyl-1,3-thiazole-5-carboxylate); fluxofenim (CGA 133205, 4'-chloro-2,2,2-trifluoroacetophenone (EZ)-O-1,3-dioxolan-2-ylmethyloxime); isoxadifen (4,5-dihydro-5,5-diphenyl-1,2-oxazole-3-carboxylic acid); mefenpyr ((RS)-1-(2,4-dichlorophenyl)-5-methyl-2-pyrazoline-3,5-dicarboxylic acid); mephenate (4-chlorophenyl methylcarbamate); MG 191; naphthalic anhydride; oxabetrinil (CGA 92194, (Z)-1,3-dioxolan-2-ylmethoxyimino(phenyl)acetonitrile); and others as are known in the art.

The core material may also further comprise a diluent. A diluent, such as a solvent, may be added to change the solubility parameter characteristics of the core material to increase or decrease the release rate of the herbicides from the microcapsule once release has been initiated. In some embodiments, the diluent is a water-insoluble organic solvent having a solubility of less than 10, 5, 1, 0.5 or even 0.1 gram per liter at 25° C.

Exemplary diluents include, for example: alkyl-substituted biphenyl compounds (e.g., SureSol 370, commercially available from Koch Co.); normal paraffin oil (e.g., NORPAR 15, commercially available from Exxon); mineral oil (e.g., ORCHEX 629, commercially available from Exxon); isoparaffin oils (e.g., ISOPAR L, ISOPAR M, and ISOPAR V, commercially available from Exxon); aliphatic fluids or oils (e.g., EXXSOL D110 and EXXSOL D130, commercially available from Exxon); alkyl acetates (e.g., EXXATE 1000, formerly commercially available from Exxon); aromatic fluids or oils (A 200, commercially available from Exxon); citrate esters (e.g., Citroflex A4, commercially available from Morflex); and, plasticizing fluids or oils used in, for examples, plastics (typically high boiling point esters). In some embodiments, the diluent comprises a paraffinic hydrocarbon solvent, preferably containing predominantly a linear or branched hydrocarbon such as pentadecane, ISOPAR V, and ISOPAR M.

The core material may comprise from 0% to about 35 wt. % of a diluent, for example from 0.1 wt. % to about 25 wt. %, from about 0.5 wt. % and about 20 wt. %, or from about 1 wt. % and 10 wt. %. In particular, the core material may comprise 0 wt. %, 0.5 wt. % 1 wt. %, 2 wt. %, 3 wt. %, 4 wt. %, 5 wt. %, 6 wt. %, 7 wt. %, 8 wt. %, 10 wt. %, 15 wt. %, 20 wt. %, 25 wt. %, 30 wt. %, or 35 wt. % diluent or any range composed of these weight percentages such as from 0% to 35 wt. %, from 1 wt. % to 30 wt. %, and so on. The weight ratio of acetamide herbicide to diluent can be, for example, from about 1:1 to about 100:1, from about 2:1 to about 100:1, from about 5:1 to about 100:1, from about 10:1 to about 100:1, from about 15:1 to about 100:1, from about 1:1 to about 50:1, from about 2:1 to about 50:1, from about 5:1 to about 50:1, from about 10:1 to about 50:1, from about 15:1 to about 50:1, from about 2:1 to about 25:1, from about 5:1 to about 25:1, from about 10:1 to about 25:1, from about 15:1 to about 25:1, or from about 15:1 to about 20:1.

Shell Wall and Formation of Microcapsules

As noted, the herbicidal microcapsules comprise a core material comprising an acetamide herbicide and a shell wall containing the core material. Typically, the shell wall comprises a polyurea.

The process of microencapsulation can be conducted according to interfacial polycondensation techniques. Microencapsulation of water-immiscible materials utilizing an interfacial polycondensation reaction generally involves dissolving a first reactive monomeric or polymeric material(s) (first shell wall component) in the material to be encapsulated (i.e., core material) to form an oil or discontinuous phase liquid. The discontinuous phase liquid is then dispersed into an aqueous or continuous phase liquid to form an oil-in-water emulsion. The continuous phase (aqueous) liquid may contain a second reactive monomeric or polymeric material (second shell wall component) at the time the discontinuous phase is dispersed into the continuous phase. If this is the case, the first and second shell wall components will immediately begin to react at the oil-in-water interface to form a polycondensate shell wall around the material(s) to be encapsulated. However, the oil-in-water emulsion can also be formed before the second shell wall component is added to the emulsion.

The oil-in-water emulsion that is formed during the interfacial polymerization reaction can be prepared by adding the oil phase to the continuous aqueous phase to which an emulsifying agent has been added (e.g., previously dissolved therein). The emulsifying agent is selected to achieve the desired oil droplet size in the emulsion. The size of the oil droplets in the emulsion is impacted by a number of factors in addition to the emulsifying agent employed and determines the size of microcapsules formed by the process. The emulsifying agent is preferably a protective colloid. Polymeric dispersants are preferred as protective colloids. Polymeric dispersants provide steric stabilization to an emulsion by adsorbing to the surface of an oil drop and forming a high viscosity layer which prevents drops from coalescing. Polymeric dispersants may be surfactants and are preferred to surfactants which are not polymeric, because polymeric compounds form a stronger interfacial film around the oil drops. If the protective colloid is ionic, the layer formed around each oil drop will also serve to electrostatically prevent drops from coalescing.

In general, the polyurea shell wall of the microcapsules is formed in a polymerization medium by a polymerization reaction between a polyisocyanate component comprising a polyisocyanate or mixture of polyisocyanates and a polyamine component comprising a polyamine or mixture of polyamines to form the polyurea. See, for example, U.S. Pat. No. 5,925,595; U.S. Publication No. 2004/0137031; and U.S. Publication No. 2010/0248963, which are incorporated herein by reference.

The acetamide herbicides encapsulated with a polyurea shell wall for use in the present invention can be prepared by contacting an aqueous continuous phase containing a polyamine component comprising a polyamine source and a discontinuous oil phase containing the acetamide herbicide and a polyisocyanate component comprising a polyisocyanate source. A polyurea shell wall is formed in a polymerization reaction between the polyamine source and the polyisocyanate source at the oil/water interface thereby forming microcapsules containing the herbicides. Accordingly, processes for preparing herbicidal microcapsules generally comprise mixing the acetamide herbicide to form a mixture and encapsulating a core material comprising the acetamide herbicide in a shell wall comprising a polyurea formed by a polymerization reaction between a polyisocyanate component comprising a polyisocyanate or mixture of polyisocyanates and a polyamine component comprising a polyamine or mixture of polyamines in a polymerization medium.

The polyurea polymer may be formed using one or more polyisocyanates, i.e., having two or more isocyanate groups per molecule. A wide variety of polyisocyanates can be employed. For example, the polyisocyanate component can comprise an aliphatic polyisocyanate (e.g., DESMODUR W and DESMODUR N 3200). In some embodiments, the polyurea shell wall is formed using a blend of at least two polyisocyanates. For example, the polyurea shell wall can be formed in an interfacial polymerization reaction using at least one diisocyanate and at least one triisocyanate (e.g., a combination of DESMODUR W and DESMODUR N 3200). In certain embodiments, the polyisocyanate component comprises a polyisocyanate based on hexamethylene-1,6-diisocyanate (e.g., DESMODUR N 3200).

Also, the polyamine source can be a single polyamine species or a mixture of two or more different polyamine species. In various embodiments, the polyamine component comprises a polyamine of the structure $NH_2(CH_2CH_2NH)_mCH_2CH_2NH_2$ where m is from 1 to 5, 1 to 3, or 2. Specific examples of polyamines include substituted or unsubstituted polyethyleneamine, polypropyleneamine, diethylene triamine and triethylenetetramine (TETA). One preferred polyamine is TETA.

It is typically advantageous to select a polyamine component and a polyisocyanate component such that the polyamine has an amine functionality of at least 2, i.e., 3, 4, 5 or more, and at least one of the polyisocyanates has an isocyanate functionality of at least 2, i.e., 2.5, 3, 4, 5, or more since high amine and isocyanate functionality increases the percentage of cross-linking occurring between individual polyurea polymers that comprise the shell wall.

In various embodiments, the polyamine has an amine functionality of greater than 2 and the polyisocyanate is a mixture of polyisocyanates wherein each polyisocyanate has an isocyanate functionality of greater than 2. In other embodiments, the polyamine comprises a trifunctional polyamine and the polyisocyanate component comprises one or more trifunctional polyisocyanates. In yet other embodiments, the shell wall is formed by the reaction between a polyisocyanate or mixture of polyisocyanates with a minimum average of 2.5 reactive groups per molecule and a polyamine with an average of at least three reactive groups per molecule.

Generally, the microcapsules prepared according to the processes described herein can be characterized as having a mean particle size of at least about 2 μm, at least about 3 μm, at least about 4 μm, at least about 5 μm, at least about 6 μm, or at least about 7 μm. In some embodiments, the microcapsules described herein are characterized as having a mean particle size of less than about 15 μm, than about 12 μm, or less than about 10 μm. For example, the microcapsules can have a mean particle size range of from about 2 μm to about 15 μm, from about 2 μm to about 12 μm, from about 2 μm to about 10 μm, from about 2 μm to about 8 μm, from about 3 μm to about 15 μm, from about 3 μm to about 10 μm, from about 3 μm to about 8 μm, from about 4 μm to about 15 μm, from about 4 μm to about 12 μm, from about 4 μm to about 10 μm, from about 4 μm to about 8 μm, from about 4 μm to about 7 μm, from about 5 μm to about 15 μm, from about 5 μm to about 12 μm, from about 5 μm to about 10 μm, from about 5 μm to about 8 μm, from about 5 μm to about 7 μm, from about 6 μm to about 15 μm, from about 6 μm to about 12 μm, from about 6 μm to about 10 μm, from about 6 μm to about 8 μm, from about 7 μm to about 15 μm, from about 7 μm to about 12 μm, from about 8 μm to about 12 μm, or from about 9 μm to about 12 μm. The microcapsules are essentially spherical such that the mean transverse dimension defined by any point on a surface of the microcapsule to a point on the opposite side of the microcapsule is essentially the diameter of the microcapsule. The mean particle size of the microcapsules can be determined by measuring the particle size of a representative sample with a laser light scattering particle size analyzer known to those skilled in the art. One example of a particle size analyzer is a Coulter LS Particle Size Analyzer.

The weight ratio of core material components to shell wall components can be adjusted to affect the release rate profile of the herbicidal microcapsules. For example, increasing the amount of shell wall relative to the amount of core material can provide for a thicker shell and reduce the herbicide release rate. In various embodiments, the weight ratio of core material to the shell wall can range from about 3:1 to about 20:1, from about 5:1 to about 20:1, from about 8:1 to about 20:1, from about 10:1 to about 20:1, from about 3:1 to about 16:1, from about 5:1 to about 16:1, from about 8:1 to about 16:1, from about 10:1 to about 16:1, from about 3:1 to about 12:1, from about 5:1 to about 12:1, from about 8:1 to about 12:1, or from about 10:1 to about 12:1.

Auxin Herbicide Component

As noted herein, various herbicidal compositions of the present invention also comprise an auxin herbicide component comprising an anion of an auxin herbicide and a salt-forming cation. For example, the auxin herbicide component can comprise an anion of an auxin herbicide selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl)pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl]pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; and butyl 4-amino-3-chloro-5-fluoro-6-(7-fluoro-1H-indol-6-yl)pyridine-2-carboxylate; and mixtures thereof. In certain embodiments, the auxin herbicide component comprises an anion of dicamba and/or 2,4-D.

The salt-forming cation of the auxin herbicide component generally comprises an agronomically acceptable cation. In various embodiments, the a salt-forming cation is selected from the group consisting of potassium (K), sodium (Na), ammonium ($NH_4$), isopropylammonium (IPA), monoethanolammonium (MEA), diethanolammonium (DEA), triethanolammonium (TEA), dimethylammonium (DMA), diglycolammonium (DGA), and mixtures thereof. In some embodiments, the auxin herbicide component comprises a dicamba salt, which can be selected from the group consisting of the sodium salt of dicamba, the potassium salt of dicamba, the monoethanolamine salt of dicamba, the diglycolamine salt of dicamba, the dimethylamine salt of dicamba, and combinations thereof.

Other agronomically acceptable salt-forming cations include polyamines such as those described in U.S. Patent Application Publication No. 2012/0184434, which is incorporated herein by reference. The cationic polyamines described in U.S. 2012/0184434 include those of formula (A)

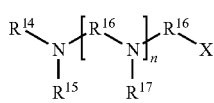

(A)

wherein $R^{14}$, $R^{15}$, $R^{17}$, $R^{19}$ and $R^{20}$ are independently H or $C_1$-$C_6$-alkyl, which is optionally substituted with OH, $R^{16}$ and $R^{18}$ are independently $C_2$-$C_4$-alkylene, X is OH or $NR^{19}R^{20}$, and n is from 1 to 20; and those of formula (B)

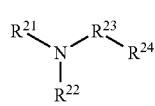

(B)

wherein $R^{21}$ and $R^{22}$ are independently H or $C_1$-$C_6$-alkyl, $R^{23}$ is $C_1$-$C_{12}$-alkylene, and $R^{24}$ is an aliphatic $C_5$-$C_8$ ring system, which comprises either nitrogen in the ring or which is substituted with at least one unit $NR^{21}R^{22}$. Specific examples of these cationic polyamines include tetraethylenepentamine, triethylenetetramine, diethylenetriamine, pentamethyldiethylenetriamine, N,N,N',N'',N''-pentamethyl-dipropylenetriamine, N,N-bis(3-dimethylaminopropyl)-N-isopropanolamine, N'-(3-(dimethylamino)propyl)-N,N-dimethyl-1,3-propanediamine, N,N-bis(3-aminopropyl)methylamine, N-(3-dimethylaminopropyl)-N,N-diisopropanolamine, N,N,N'-trimethylaminoethyl-ethanolamine, aminopropylmonomethylethanolamine, and aminoethylethanolamine, and mixtures thereof.

Stabilization of Herbicidal Compositions

As noted, applicants have surprisingly discovered a series of effective strategies to chemically stabilize herbicidal compositions comprising a combination of microencapsulated acetamide herbicides and auxin herbicides to reduce or eliminate progressive decomposition or degradation of the herbicide actives. Generally, the compositions of the present invention include one or more of the features described below to employ at least one of the strategies for improving chemical stability.

Chemical stability is evaluated by determining the weight % recovery of the acetamide herbicide and/or auxin herbicide after storage for a period of time at a fixed temperature. For example, in one stability test, the composition is stored at 40° C. for 8 weeks. In another stability test, the composition is stored at 54° C. for 8 weeks, 4 weeks, 2 weeks, or 1 week. The herbicide concentrations are measured at the beginning of the storage period and at the end of the storage period. The weight % recovery of the acetamide herbicide and/or auxin herbicide is calculated by dividing the final concentration (e.g., weight % after storage period) of the acetamide herbicide and/or auxin herbicide by the initial concentration (e.g., weight % at start of storage period) of the respective herbicide and multiplying by 100%. The greater the weight % recovery of the herbicide, the greater the chemical stability of the composition.

One strategy for improving chemical stability discovered by applicants includes decreasing the pH of the composition, for example, by the addition of an acidic pH adjusting agent. Acidic pH adjusting agents include, for example, strong acids such as hydrochloric acid, sulfuric acid, nitric, acid, and phosphoric acid. Weak acids can also be used as acidic pH adjusting agents. Weak acids include various carboxylic acids (e.g., monocarboxylic acids) including, for example, formic acid, acetic acid, lactic acid, and glycolic acid. When employing this strategy, the pH of the composition is typically no greater than about 4.5, no greater than about 4.0, no greater than about 3.8, no greater than about 3.5, or no greater than about 3.3. In various embodiments, the pH of the composition is from about 2 to about 4.5, from about 2 to about 4, from about 2 to about 3.8, from about 2 to about 3.5, from about 2 to about 3.3, from about 2.5 to about 4.5, from about 2.5 to about 4, from about 2.5 to about 3.8, from about 2.5 to about 3.5, from about 2.5 to about 3.3, from about 3 to about 4.5, from about 3 to about 4, from about 3 to about 3.8, from about 3 to about 3.5, from about 3 to about 3.3, from about 3.5 to about 4.5, from about 3.5 to about 4.0, or from about 3.5 to about 3.8. To measure the pH of the composition, the pH probe of a suitably calibrated pH meter is inserted into a sample of the composition, and the pH is recorded after an elapsed time of 6 minutes.

Another strategy for improving chemical stability is formulating the composition with an auxin herbicide that is partially neutralized (rather than fully neutralized) during preparation of the composition (i.e., a mixture of auxin herbicide acid and salt). Under this strategy, the molar ratio of the salt-forming cation to the anion of the auxin herbicide is generally less than 1:1, but more particularly, is no greater than about 0.8:1, no greater than about 0.75:1, no greater than about 0.7:1, no greater than about 0.65:1, no greater than about 0.6:1, no greater than about 0.55:1, no greater than about 0.5:1, no greater than about 0.45:1, no greater than about 0.4:1, no greater than about 0.35:1, no greater than about 0.3:1, no greater than about 0.25:1, or no greater than about 0.2:1. In various embodiments, the molar ratio of the salt-forming cation to the anion of the auxin herbicide is from about 0.2:1 to about 0.8:1, from about 0.2:1 to about 0.75:1, from about 0.2:1 to about 0.7:1, from about 0.2:1 to about 0.65:1, from about 0.2:1 to about 0.6:1, from about 0.2:1 to about 0.55:1, from about 0.2:1 to about 0.5:1, from about 0.2:1 to about 0.45:1, from about 0.2:1 to about 0.4:1, from about 0.2:1 to about 0.35:1, from about 0.2:1 to about 0.3:1, from about 0.3:1 to about 0.8:1, from about 0.3:1 to about 0.75:1, from about 0.3:1 to about 0.7:1, from about 0.3:1 to about 0.65:1, from about 0.3:1 to about 0.6:1, from about 0.3:1 to about 0.55:1, from about 0.3:1 to about 0.5:1, from about 0.3:1 to about 0.45:1, from about 0.3:1 to about 0.4:1, from about 0.4:1 to about 0.8:1, from about 0.4:1 to about 0.75:1, from about 0.4:1 to about 0.7:1, from about 0.4:1 to about 0.65:1, from about 0.4:1 to about 0.6:1, from about 0.4:1 to about 0.55:1, from about 0.4:1 to about 0.5:1, from about 0.5:1 to about 0.8:1, from about 0.5:1 to about 0.75:1, from about 0.5:1 to about 0.7:1, from about 0.5:1 to about 0.65:1, from about 0.5:1 to about 0.6:1, from about 0.5:1 to about 0.55:1, from about 0.6:1 to about 0.8:1, from about 0.6:1 to about 0.75:1, from about 0.6:1 to about 0.7:1, or from about 0.6:1 to about 0.65:1. In these embodiments, the anions of the auxin herbicide that are not neutralized can be in acid form. Without being bound by theory, it is thought that the salt form or disassociated form of the auxin herbicide is more prone to react with the microencapsulated acetamide herbicide than the acid form of the auxin herbicide. Thus, increasing the amount of auxin herbicide acid present is thought to improve chemical stability. Also, using a greater portion of auxin herbicide acid lowers the pH of the composition and reduces the amount of acid that would otherwise be needed to reduce the pH of the composition under the aforementioned strategy if also employed.

A further strategy for improving chemical stability is formulating the composition with an emulsifier that is functional at approximately neutral pH (e.g., pH 6-9) but also at low pH, such as less than about 4.5, less than about 4.0, less than about 3.8, less than about 3.5, or less than about 3.3. As noted, during preparation of the microcapsules by interfacial polymerization, an oil-in-water emulsion is formed by adding the oil phase (e.g., comprising the acetamide herbicide) to the continuous aqueous phase (e.g., water) to which one or more emulsifiers is added (e.g., previously dissolved therein). Various emulsifiers that are functional at acidic pH comprise anionic surfactants comprising a strong or mineral acid functionality, amphoteric surfactants comprising a strong or mineral acid functionality, nonionic surfactants having a molecular weight of at least about 1,000 Da, at least about 2,000 Da, at least about 5,000 Da, or at least about 10,000 Da, and mixtures of these. In some embodiments, the emulsifier comprises an anionic surfactant comprising a strong or mineral acid functionality (e.g., sulfuric acid or phosphoric acid functionality). For example, the anionic surfactant comprising a strong or mineral acid functionality can have a pKa of less than about 4.5, less than about 4, or less than about 3.8.

Examples of anionic surfactants include alkali, alkaline earth and ammonium salts of sulfonates, sulfates, phosphates, and carboxylates. Examples of sulfonates include alkyl ether sulfonates, aryl ether sulfonates, alkylaryl ether sulfonates, alkylaryl sulfonates, diphenyl sulfonates, alpha-olefin sulfonates, lignosulfonates, copolymers of lignosulfonates, sulfonates of fatty acids and oils, sulfonates of ethoxylated alkyl phenols, sulfonates of alkoxylated aryl phenols, sulfonates of condensed naphthalenes, sulfonates of dodecyl- and tridecylbenzenes, sulfonates of naphthalenes and alkylnaphthalenes, sulfosuccinates or sulfosuccinamates, sulfonated styrene maleic anhydrite copolymers, and hydrophobically-modified 2-acrylamido-2-methylpropane sulfonic acid (AMPS) polymers/copolymers. Examples of sulfates include alkyl ether sulfates, aryl ether sulfates, alkylaryl ether sulfates, sulfates of fatty acids and oils, sulfates of ethoxylated alkylphenols, sulfates of alcohols, sulfates of ethoxylated alcohols, or sulfates of fatty acid esters. Examples of phosphates include alkyl ether phosphates, ethoxylated tristyrylphenol phosphates, and mixtures thereof. Examples of carboxylates include alkyl carboxylates, and carboxylated alcohols or alkyl phenol ethoxylates.

In various embodiments, the anionic surfactant comprising a strong acid functionality comprises a lignosulfonate salt. The lignosulfonate salt can comprise an alkali and/or alkaline earth metal salt (e.g., sodium lignosulfonate). In some embodiments, the lignosulfonate salt has an average molecular weight of at least about 400 Da, at least about 1,000 Da, or at least about 10,000 Da. For example, the lignosulfonate salt can have an average molecular weight from about 400 Da to about 1,000,000 Da, from about 1,000 Da to about 1,000,000 Da, or from about 10,000 Da to about 1,000,000 Da. In further embodiments, the lignosulfonate salt can have a degree of sulfonation that is from about 0.5 wt. % to about 10 wt. % and/or a degree of carboxylation that is from about 0.5 wt. % to about 5 wt. %. In certain embodiments the lignosulfonate salt is derived from kraft lignin or sulfite liquor. In some embodiments, the lignosulfonate salt is obtained from ultrafiltered lignosulfonates.

In further embodiments, the emulsifier comprises a nonionic surfactant having a molecular weight of at least about 1,000 Da, at least about 2,000 Da, at least about 5,000 Da, or at least about 10,000 Da. Examples of these nonionic surfactants include N-substituted fatty acid amides, amine oxides, esters, sugar-based surfactants (e.g., alkyl polyglycosides), polyvinyl alcohol (e.g., with 10-20% degree of hydrolysis), hydrophobically-modified vinyl pyrrolidone (e.g., vinylpyrrolidone dimethylaminoethyl methacrylate copolymers polymers), various alkoxylates (e.g., butyl ethers of EO/PO block copolymers, alkylated ethylene oxide polymers such as PEG-100 stearate, and alkylated polyglycerin polymers such as polyglyceryl-10 laurate), modified starches, modified cellulosics (e.g., hydroxyethyl cellulose, hydroxypropyl cellulose, and carboxymethyl cellulose), and mixtures thereof.

In various embodiments, the weight ratio of the acetamide to the emulsifier is at least about 1:1, at least about 2:1, at least about 3:1, at least about 5:1, at least about 10:1, or at least about 50:1. For example, the weight ratio of the acetamide to the emulsifier can be from about 2:1 to about 500:1, from about 2:1 to about 100:1, from about 2:1 to about 50:1, from about 2:1 to about 10:1, from about 2:1 to about 5:1, from about 3:1 to about 500:1, from about 3:1 to about 100:1, from about 3:1 to about 50:1, from about 3:1 to about 10:1, or from about 3:1 to about 5:1. In some embodiments, various aqueous herbicidal concentrate compositions as described herein can have an emulsifier content of at least about 0.1 wt. %, at least about 0.5 wt. %, at least about 1 wt. %, at least about 2 wt. %, or at least about 5 wt. %. For example, the emulsifier content can range from about 0.1 wt. % to about 15 wt. %, from about 0.5 wt. % to about 15 wt. %, from about 1 wt. % to about 15 wt. %, from about 2 wt. % to about 15 wt. %, from about 5 wt. % to about 15 wt. %, from about 8 wt. % to about 15 wt. %, from about 10 wt. % to about 15 wt. %, from about 0.1 wt. % to about 10 wt. %, from about 0.5 wt. % to about 10 wt. %, from about 1 wt. % to about 10 wt. %, from about 2 wt. % to about 10 wt. %, from about 5 wt. % to about 10 wt. %, or from about 8 wt. % to about 10 wt. %.

Yet another strategy for improving chemical stability involves controlling the relative ratio of amine molar equivalents contained in the polyamine component to molar equivalents of isocyanates contained in the polyisocyanate component when preparing a polyurea shell wall for encapsulating the acetamide herbicide and other core materials (when present). Generally, a sufficient amount of polyamine component is provided to the reaction medium such that the polyisocyanate is completely reacted. Complete reaction of the polyisocyanate component increases the percentage of cross-linking between polyurea polymers formed in the reaction thereby providing structural stability to the shell wall. In some cases, a substantial excess of amine molar equivalents is provided such that the ratio of amine molar equivalents to isocyanate molar equivalents used in preparation of the shell wall of the microcapsules is at least about 1.1:1, at least about 1.15:1, or at least about 1.2:1. For example, in some embodiments, the ratio of amine molar equivalents to isocyanate molar equivalents is from about 1.1:1 to about 1.7:1, from about 1.1:1 to about 1.6:1, from about 1.1:1 to about 1.5:1, from about 1.1:1 to about 1.4:1, from about 1.1:1 to about 1.3:1, from about 1.1:1 to about 1.2:1, from about 1.15:1 to about 1.7:1, from about 1.15:1 to about 1.6:1, from about 1.15:1 to about 1.5:1, from about 1.15:1 to about 1.4:1, from about 1.15:1 to about 1.3:1, from about 1.2:1 to about 1.7:1, from about 1.2:1 to about 1.6:1, from about 1.2:1 to about 1.5:1, from about 1.2:1 to about 1.4:1, or from about 1.2:1 to about 1.3:1.

In other cases, using a substantial excess of amine molar equivalents to isocyanate molar equivalents has been found to be a factor potentially affecting the stability of certain formulations. Accordingly, in various embodiments, an equimolar or slight excess of amine molar equivalents to isocyanate molar equivalents is supplied to the reaction medium. That is, the molar ratio of amine molar equivalents to isocyanate molar equivalents used in preparation of the shell wall of the microcapsules is typically about 1:1 or slightly greater (e.g., no greater than about 1.01:1, no greater than about 1.02:1, or no greater than about 1.05:1). In some instances, the reaction medium can contain one or more other ingredients besides the polyamine component that can react with the polyisocyanate component. In these instances, the ratio of amine molar equivalents to isocyanate molar equivalents can be slightly less than 1:1, such as at least about 0.9:1 or at least about 0.95:1. Accordingly, in various embodiments, the ratio of amine molar equivalents contained in the polyamine component to isocyanate molar equivalents contained in the polyisocyanate component is from about 0.9:1 to about 1.1:1, from about 0.9:1 to about 1.05:1, from about 0.9:1 to about 1.01:1, from about 0.9:1 to about 1:1, from about 0.95:1 to about 1.1:1, from about 0.95:1 to about 1.05:1, from about 0.95:1 to about 1.01:1, from about 0.95:1 to about 1:1, from about 1:1 to about 1.1:1, from about 1:1 to about 1.05:1, from about 1:1 to about 1.01:1, from about 1.01:1 to about 1.1:1, or from about 1.05:1 to about 1.1:1.

The ratio of amine molar equivalents to isocyanate molar equivalents is calculated according to the following equation:

$$\text{Molar Equivalents Ratio} = \frac{\text{amine molar equivalents}}{\text{isocyanate molar equivalents}} \quad (1)$$

In the above equation (1), the amine molar equivalents is calculated according to the following equation:

molar equivalents=Σ(polyamine weight/equivalent weight).

In the above equation (1), the isocyanate molar equivalents is calculated according to the following equation:

isocyanate molar equivalents=Σ(polyisocyanate weight/equivalent weight).

The equivalent weight is generally calculated by dividing the molecular weight in grams/mole by the number of functional groups per molecules and is in grams/mole. For some molecules, such as triethylenetetramine ("TETA") and 4,4'-diisocyanato-dicyclohexyl methane ("DES W"), the equivalent weight is equal to the molecular weight divided by the number of functional groups per molecule. For example, TETA has a molecular weight of 146.23 g/mole and 4 amine groups. Therefore, the equivalent weight is 36.6 g/mol. This calculation is generally correct, but for some materials, the actual equivalent weight may vary from the calculated equivalent weight. In some components, for example, the biuret-containing adduct (i.e., trimer) of hexamethylene-1,6-diisocyanate, the equivalent weight of the commercially available material differs from the theoretical equivalent weight due to, for example, incomplete reaction. The theoretical equivalent weight of the biuret-containing adduct (i.e., trimer) of hexamethylene-1,6-diisocyanate is 159.5 g/mol. The actual equivalent weight of the trimer of hexamethylene-1,6-diisocyanate ("DES N3200"), the commercially available product, is about 183 g/mol. This actual equivalent weight is used in the calculations above. The actual equivalent weight may be obtained from the manufacturer or by titration with a suitable reactant by methods known in the art. The symbol, Σ, in the amine molar equivalents calculation means that the amine molar equivalents comprises the sum of amine molar equivalents for all polyamines in the reaction medium. Likewise, the symbol, Σ, in the isocyanate molar equivalents calculation means that the isocyanate molar equivalents comprises the sum of isocyanate molar equivalents for all polyisocyanates in the reaction medium.

Yet another strategy for improving chemical stability is incorporating an effective amount of ferric sulfate. Without bounding to any theory, it is hypothesized that the addition of $Fe^{3+}$ could chelate free polyamines (e.g., excess polyamines used in the formation of polyurea microcapsules) that may be present in the aqueous medium of the aqueous herbicidal concentrate compositions, thereby reducing free polyamines that could react with herbicide components such as the auxin herbicide component. In various embodiments, the concentration of the ferric sulfate is from about 0.1 wt. % to about 2 wt. %, from about 0.2 wt. % to about 2 wt. %, from about 0.4 wt. % to about 2 wt. %, from about 0.6 wt. % to about 2 wt. %, from about 0.1 wt. % to about 1 wt. %, from about 0.2 wt. % to about 1 wt. %, from about 0.4 wt. % to about 1 wt. %, or from about 0.6 wt. % to about 1 wt. %.

A further strategy for improving chemical stability and volatility of the auxin herbicide is incorporating an effective amount of alkylene glycol. Without being bound by theory, it is believe that the alkylene glycol forms a complex with the auxin herbicide, particularly the auxin herbicide in acid form. It is theorized that this complex is both unreactive and relatively non-volatile. In various embodiments, the alkylene glycol comprises a $C_2$ to $C_{10}$ glycol or more particularly a $C_2$ to $C_6$ glycol. In some embodiments, the alkylene glycol comprises a branched $C_2$ to $C_{10}$ or $C_2$ to $C_6$ glycol. Branched glycols have been found in some cases to provide even greater improvement in reducing auxin herbicide volatility. In certain embodiments, the alkylene glycol is selected from the group consisting of propylene glycol; hexylene glycol; 1,3-propanediol; 1,4-butanediol; 1,3-butanediol; and mixtures thereof. One preferred alkylene glycol includes propylene glycol.

Generally, at least an equimolar ratio of alkylene glycol to the auxin herbicide is needed to impart improved chemical stability with higher amounts providing for even greater stability. In various embodiments, the molar ratio of alkylene glycol to the auxin herbicide is at least about 1:1, at least about 1.5:1, at least about 2:1, at least about 2.5:1, at least about 3:1, at least about 3.5:1, or at least about 4:1. In some embodiments, the molar ratio of alkylene glycol to the auxin herbicide is from about 1:1 to about 10:1, from about 2:1 to about 10:1, from about 3:1 to about 10:1, from about 4:1 to about 10:1, from about 1:1 to about 7.5:1, from about 2:1 to about 7.5:1, from about 3:1 to about 7.5:1, from about 4:1 to about 7.5:1, from about 1:1 to about 5:1, from about 2:1 to about 5:1, from about 3:1 to about 5:1, or from about 4:1 to about 5:1. In other terms, the alkylene glycol concentration can be at least about 5 wt. %, at least about 10 wt. %, at least about 15 wt. %, at least about 20 wt. %, at least about 25 wt. %, or at least about 30 wt. %. For example, the alkylene glycol concentration can be from about 5 wt. % to about 40 wt. %, from about 5 wt. % to about 35 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 40 wt. %, from about 10 wt. % to about 35 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 40 wt. %, from about 15 wt. % to about 35 wt. %, from about 15 wt. % to about 30 wt. %, from about 20 wt. % to about 40 wt. %, from about 20 wt. % to about 35 wt. %, or from about 20 wt. % to about 30 wt. %.

In view of these strategies, various herbicidal compositions of the present invention comprise:
(a) microcapsules dispersed in an aqueous liquid medium wherein the microcapsules comprise a core material comprising an acetamide herbicide and a polyurea shell wall encapsulating the core material, wherein the acetamide herbicide concentration in the composition on an active ingredient basis is at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, or at least about 60 wt. %, and
(b) an auxin herbicide component comprising an anion of an auxin herbicide and a salt-forming cation, wherein the auxin co-herbicide concentration in the composition on an acid equivalent basis is at least about 1 wt. %, at least about 5 wt. %, or at least 10 wt. %, and wherein the composition further satisfies one or more of the following conditions:
(i) a pH that is no greater than about 4.5, no greater than about 4.0, no greater than about 3.8, no greater than about 3.5, or no greater than about 3.3;
(ii) a molar ratio of the salt-forming cation to the anion of the auxin herbicide that is no greater than about 0.8:1, no greater than about 0.75:1, no greater than about 0.7:1, no greater than about 0.65:1, no greater than about 0.6:1, no greater than about 0.55:1, no greater than about 0.5:1, no greater than about 0.45:1, no greater than about 0.4:1, no greater than about 0.35:1, no greater than about 0.3:1, no greater than about 0.25:1, or no greater than about 0.2:1;
(iii) the composition further comprises an emulsifier comprising an anionic surfactant comprising a strong or mineral acid functionality, an amphoteric surfactant comprising a strong or mineral acid functionality, and/or a nonionic surfactant having a molecular weight of at least about 1,000 Da, at least about 2,000 Da, at least about 5,000 Da, or at least about 10,000 Da;
(iv) the composition further comprises ferric sulfate; and/or
(v) the composition further comprises an alkylene glycol.

In various embodiments, the compositions satisfy at least two, at least three, at least four, five or all of the conditions of (i), (ii), (iii), (iv), (v), and (vi).

As noted, the concentrates compositions described herein can exhibit improved storage stability across a wide range of temperatures and storage periods. In this context, physical storage stability is generally defined as the absence of phase separation or crystallization and the lack of significant change in the rheological properties of the composition (e.g., viscosity). Chemical storage stability is evaluated by determining the weight % recovery of the agrochemical component after storage for a period of time at a fixed temperature as described herein.

In various embodiments, the concentrate compositions are storage-stable (physically and chemically stable) at 25° C. for at least about 1 week, at least about 2 weeks, at least about 3 weeks, at least about 4 weeks, at least about 5 weeks, at least about 1 month, at least about 2 months, at least about 3 months, at least about 6 months, at least about 12 months, or at least about 18 months.

In some embodiments, the concentrate compositions are storage-stable at 40° C. for at least about 1 week, at least about 2 weeks, at least about 3 weeks, at least about 4 weeks, at least about 5 weeks, at least about 1 month, at least about 2 months, at least about 3 months, at least about 6 months, at least about 12 months, or at least about 18 months.

In various embodiments, the concentrate compositions are storage-stable at 54° C. for at least about 1 week, at least about 2 weeks, at least about 3 weeks, at least about 4 weeks, at least about 5 weeks, at least about 1 month, at least about 2 months, at least about 3 months, at least about 6 months, at least about 12 months, or at least about 18 months.

Volatility Control Additive

The herbicidal compositions described herein can further comprise a volatility control additive to control or reduce potential herbicide volatility (e.g., auxin herbicide volatility). For example, as described in U.S. Application Publication Nos. 2014/0128264 and 2015/0264924, which are incorporated herein by reference, additives to control or reduce potential herbicide volatility include various monocarboxylic acids, or salts thereof (e.g., acetic acid and/or an agriculturally acceptable salt thereof. Representative monocarboxylic acids and monocarboxylates generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl). In particular, the monocarboxylic acid can be selected from the group consisting of formic acid, acetic acid, propionic acid, and benzoic acid. The monocarboxylate salt can be selected from the group consisting of formate salts, acetate salts, propionate salts, and benzoate salts. The monocarboxylate salts can include, for example, alkali metal salts selected from sodium and potassium (e.g., sodium acetate, sodium formate, potassium acetate, and potassium formate).

In some embodiments, the monocarboxylic acid and/or salt thereof comprises formic acid and/or salt thereof. In certain embodiments, the volatility control additive comprises an alkali metal salt thereof (e.g., sodium and potassium salts).

Typically, the acid equivalent molar ratio of the volatility control additive to the auxin herbicide component is at least about 1:10, at least about 1:5, at least about 1:3, at least about 1:2, at least about 1:1, at least about 2:1, at least about 3:1, at least about 4:1, at least about 5:1, at least about 6:1, at least about 8:1, or at least about 10:1. For example, the volatility control additive to the auxin herbicide component can be from about 10:1 to about 1:10, from about 10:1 to about 1:5, from about 5:1 to about 1:5, from about 3:1 to about 1:3, from about 2:1 to about 1:2, from about 1:1 to about 10:1, from about 1:1 to about 8:1, from about 1:1 to about 6:1, from about 1:1 to about 5:1, from about 1:1 to about 4:1, from about 1:1 to about 3:1, or from about 1:1 to about 2:1.

In various herbicidal concentrate compositions, the concentration of the volatility control additive is at least about 3 wt. %, at least about 5 wt. %, at least about 10 wt. %, at least about 12.5 wt. %, or at least about 15 wt. % on acid equivalent basis. For example, the concentration of the volatility control additive can be from about 3 wt. % to about 30 wt. %, from about 3 wt. % to about 25 wt. %, from about 3 wt. % to about 20 wt. %, from about 4 wt. % to about 20 wt. %, from about 5 wt. % to about 20 wt. %, from about 7 wt. % to about 20 wt. %, from about 8 wt. % to about 20 wt.

%, from about 9 wt. % to about 20 wt. %, from about 10 wt. % to about 20 wt. %, or from about 10 wt. % to about 15 wt. % on acid equivalent basis.

Additional Herbicide Ingredients

The herbicidal compositions of the present invention can further comprise an additional herbicide (i.e., in addition to the microencapsulated acetamide herbicide and auxin herbicide). Generally, the additional herbicide is added to the liquid medium comprising the microcapsules dispersed therein and the auxin herbicide component.

Additional herbicides can be water-soluble and are typically be selected from the group consisting of acetyl CoA carboxylase (ACCase) inhibitors, enolpyruvyl shikimate-3-phosphate synthase (EPSPS) inhibitors, glutamine synthetase inhibitors, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, hydroxyphenylpyruvate dioxygenase (HPPD) inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof. Examples of herbicides within these classes are provided below. Where an herbicide is referenced generically herein by name, unless otherwise restricted, that herbicide includes all commercially available forms known in the art such as salts, esters, free acids and free bases, as well as stereoisomers thereof. For example, where the herbicide name "glyphosate" is used, glyphosate acid, salts and esters are within the scope thereof.

In various embodiments, the additional herbicide comprises an EPSPS herbicide such as glyphosate or a salt or ester thereof.

In further embodiments, the additional herbicide comprises a glutamine synthetase herbicide including glufosinate or glufosinate-P, or a salt or and ester thereof.

In still further embodiments, the additional herbicide comprises a PPO inhibitor. PPO inhibitors include, for example, acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, salts and esters thereof, and mixtures thereof. In particular embodiments, the additional herbicide comprises fomesafen and/or a salt of fomesafen such as sodium fomesafen.

In various embodiments, the additional herbicide comprises a HPPD inhibitor. HPPD inhibitors include, for example, aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione and topramezone, tolpyralate, tefuryltrione, salts and esters thereof, and mixtures thereof.

In other embodiments, the additional herbicide comprises a PS II inhibitor. PS II inhibitors include, for example, ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof.

In certain embodiments, the additional herbicide comprises an ACCase inhibitor. ACCase inhibitors include, for example, alloxydim, butroxydim, clethodim, cycloxydim, pinoxaden, sethoxydim, tepraloxydim and tralkoxydim, salts and esters thereof, and mixtures thereof. Another group of ACCase inhibitors include chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop and trifop, salts and esters thereof, and mixtures thereof. ACCase inhibitors also include mixtures of one or more "dims" and one or more "fops", salts and esters thereof.

In various embodiments, the additional herbicide comprises an ALS or AHAS inhibitor. ALS and AHAS inhibitors include, for example, amidosulfuron, azimsulfruon, bensulfuron-methyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halosulfuron-methyl, imazamethabenz, imazamox, imazapic, imazapyr, imazaquin, imazethapyr, imazosulfuron, iodosulfuron, metsulfuron-methyl, nicosulfuron, penoxsulam, primisulfuron-methyl, propoxycarbazone-sodium, prosulfuron, pyrazosulfuron-ethyl, pyribenzoxim, pyrithiobac, rimsulfuron, sulfometuron-methyl, sulfosulfuron, thiencarbazone, thifensulfuron-methyl, triasulfuron, tribenuron-methyl, trifloxysulfuron and triflusulfuron-methyl, salts and esters thereof, and mixtures thereof.

In further embodiments, the additional herbicide comprises a mitosis inhibitor. Mitosis inhibitors include anilofos, benefin, DCPA, dithiopyr, ethalfluralin, flufenacet, mefenacet, oryzalin, pendimethalin, thiazopyr and trifluralin, salts and esters thereof, and mixtures thereof.

In some embodiments, the additional herbicide comprises a PS I inhibitor such as diquat and paraquat, salts and esters thereof, and mixtures thereof.

In other embodiments, the additional herbicide comprises a cellulose inhibitor such as dichlobenil and isoxaben.

In still further embodiments, the additional herbicide comprises an oxidative phosphorylation uncoupler such as dinoterb, and esters thereof.

In other embodiments, the additional herbicide comprises an auxin transport inhibitor such as diflufenzopyr and naptalam, salts and esters thereof, and mixtures thereof.

In various embodiments, the additional herbicide comprises a dihydropteroate synthase inhibitor such as asulam and salts thereof.

In some embodiments, the additional herbicide comprises a fatty acid and lipid biosynthesis inhibitor such as bensulide, butylate, cycloate, EPTC, esprocarb, molinate, pebulate, prosulfocarb, thiobencarb, triallate and vernolate, salts and esters thereof, and mixtures thereof.

Some preferred additional herbicides flumioxazin, fluometuron, diuron, sulfentrazone, fomesafen, saflufenacil, thiencarbazone, mesotrione, atrazine, isoxaflutole, 2,4-D, dicamba and glyphosate, salts and esters thereof, racemic mixtures and resolved isomers thereof, and mixtures thereof.

The additional herbicide can include a combination of herbicides described above.

Release Modulating Agent

The herbicidal compositions of the present invention can also further comprise a release modulating agent that modulates the release rate of the microencapsulated herbicide. Release modulating agents are described in U.S. Patent Application Publication No. 2016/0192645, which is hereby incorporated by reference herein. In various embodiments, the release modulating agent comprises a polyvalent metal cation. The release modulating agent can be added to a liquid herbicidal composition as a water soluble salt or salt solution (e.g., added to the liquid medium, but not the core material of the microcapsules). In some embodiments, the release modulating agent comprises a polyvalent metal cation. The polyvalent ions can be ions of metals selected the group consisting of magnesium, calcium, aluminum, manganese, iron, copper, zinc, and combinations thereof. In certain embodiments, the polyvalent metal cation comprises $Ca^{2+}$.

The molecular weight of the release modulating agent can be relatively small being no greater than about 1000 g/mol, no greater than about 750 g/mol, no greater than about 500 g/mol, no greater than about 300 g/mol, or no greater than about 200 g/mol. For example, the molecular weight of the release modulating agent can be from about 50 g/mol to about 1000 g/mol, from about 50 g/mol to about 750 g/mol, from about 50 g/mol to about 500 g/mol, from about 50 g/mol to about 300 g/mol, from about 50 g/mol to about 200 g/mol, from about 100 g/mol to about 1000 g/mol, from about 100 g/mol to about 750 g/mol, from about 100 g/mol to about 500 g/mol, from about 100 g/mol to about 300 g/mol, or from about 100 g/mol to about 200 g/mol.

The release modulating agent can also comprise an organic anion. For example, the release modulating agent can comprise an anion selected from the group consisting of acetate, citrate, carbonate, oxalate and combinations thereof (e.g., calcium acetate). Alternatively, the release modulating agent can comprise an inorganic anion. For example, the release modulating agent can be a salt of a mineral acid such as a halide of salt (e.g., calcium chloride). Also, the release modulating agent can comprise a sulfate anion (e.g., copper sulfate). A mixture of salts can be added to the liquid herbicidal compositions as the release modulating agent. For example, the release modulating agent can comprise a combination of a calcium salt such as calcium chloride or calcium acetate and a copper salt such as copper sulfate.

The ratio of moles of polyvalent metal cation to amine molar equivalents contained in the polyamine component used to form the polyurea shell wall can be from about 0.05:1 to about 10:1, from about 0.05:1 to about 5:1, from about 0.05:1 to about 3:1, from about 0.05:1 to about 2:1, from about 0.05:1 to about 1.75:1, from about 0.05:1 to about 1.5:1, from about 0.05:1 to about 1:1, from about 0.1:1 to about 10:1, from about 0.1:1 to about 5:1, from about 0.1:1 to about 3:1, from about 0.1:1 to about 2:1, from about 0.1:1 to about 1.75:1, from about 0.1:1 to about 1.5:1, from about 0.1:1 to about 1:1, from about 0.2:1 to about 10:1, from about 0.2:1 to about 5:1, from about 0.2:1 to about 3:1, from about 0.2:1 to about 2:1, from about 0.2:1 to about 1.75:1, from about 0.2:1 to about 1.5:1, from about 0.2:1 to about 1:1, from about 0.3:1 to about 10:1, from about 0.3:1 to about 5:1, from about 0.3:1 to about 3:1, from about 0.3:1 to about 2:1, from about 0.3:1 to about 1.75:1, from about 0.3:1 to about 1.5:1, from about 0.3:1 to about 1:1, from about 0.4:1 to about 10:1, from about 0.4:1 to about 5:1, from about 0.4:1 to about 3:1, from about 0.4:1 to about 2:1, from about 0.4:1 to about 1.75:1, from about 0.4:1 to about 1.5:1, from about 0.4:1 to about 1:1, from about 0.5:1 to about 10:1, from about 0.5:1 to about 5:1, from about 0.5:1 to about 3:1, from about 0.5:1 to about 2:1, from about 0.5:1 to about 1.75:1, from about 0.5:1 to about 1.5:1, or from about 0.5:1 to about 1:1.

In various embodiments, the mole ratio of acetamide herbicide to polyvalent metal cation can be from 1:1 to about 100:1, from about 2:1 to about 100:1, from about 2:1 to about 80:1, from about 3:1 to about 80:1, from about 3:1 to about 60:1, from about 3:1 to about 40:1, from about 4:1 to about 100:1, from about 4:1 to about 80:1, from about 4:1 to about 60:1, from about 4:1 to about 40:1, from about 4:1 to about 25:1, from about 5:1 to about 100:1, from about 5:1 to about 80:1, from about 5:1 to about 60:1, from about 5:1 to about 40:1, or from about 5:1 to about 25:1.

In various embodiments where the herbicidal composition is a concentrate composition, the concentration of the release modulating agent can be from about 0.1 wt. % to about 5 wt. %, from about 0.1 wt. % to about 3 wt. %, from about 0.1 wt. % to about 2 wt. %, from about 0.2 wt. % to about 5 wt. %, from about 0.2 wt. % to about 3 wt. %, from about 0.5 wt. % to about 5 wt. %, or about 0.5 wt. % to about 3 wt. %.

Other Herbicidal Compositions Additives

The herbicidal compositions may optionally be further formulated with additives as described elsewhere herein (e.g., a stabilizer, one or more surfactants, an antifreeze, an anti-packing agent, drift control agents, safeners, etc.).

The herbicidal compositions can be formulated to further optimize its shelf stability and safe use. Dispersants, stabilizers, and thickeners are useful to inhibit the agglomeration and settling of the microcapsules. This function is facilitated by the chemical structure of these additives as well as by equalizing the densities of the aqueous and microcapsule phases. Anti-packing agents are useful when the microcapsules are to be redispersed. A pH buffer can be used to maintain the pH of the dispersion within desired ranges.

Thickeners are useful in retarding the settling process by increasing the viscosity of the aqueous phase. Shear-thinning thickeners may be preferred, because they act to reduce dispersion viscosity during pumping, which facilitates the economical application and even coverage of the dispersion to an agricultural field using the equipment commonly employed for such purpose. The viscosity of the microcapsule dispersion upon formulation may preferably range from about 100 cps to about 400 cps, as tested with a Haake Rotovisco Viscometer and measured at about 10° C. by a spindle rotating at about 45 rpm. More preferably, the viscosity may range from about 100 cps to about 300 cps. A few examples of useful shear-thinning thickeners include water-soluble, guar- or xanthan-based gums (e.g. Kelzan from CPKelco), cellulose ethers (e.g. ETHOCEL from Dow), modified cellulosics and polymers (e.g. Aqualon thickeners from Hercules), and microcrystalline cellulose anti-packing agents.

Adjusting the density of the aqueous phase to approach the mean weight per volume of the microcapsules also slows down the settling process. In addition to their primary purpose, many additives may increase the density of the aqueous phase. Further increase may be achieved by the addition of sodium chloride, glycol, urea, or other salts.

In order to enhance shelf stability and prevent gelling of dispersions of microcapsules in the herbicidal compositions, particularly upon storage in high temperature environments, the herbicidal compositions may further include urea or similar structure-breaking agent at a concentration of up to about 20% by weight, typically about 5% by weight.

Surfactants can optionally be included in the compositions of the present invention. Suitable surfactants are selected from non-ionics, cationics, anionics and mixtures thereof. Examples of surfactants suitable for the practice of the present invention include, but are not limited to: alkoxylated tertiary etheramines (such as TOMAH E-Series surfactants); alkoxylated quaternary etheramine (such as TOMAH Q-Series surfactant); alkoxylated etheramine oxides (such as TOMAH AO-Series surfactant); alkoxylated tertiary amine oxides (such as AROMOX series surfactants); alkoxylated tertiary amine surfactants (such as the ETHOMEEN T and C series surfactants); alkoxylated quaternary amines (such as the ETHOQUAD T and C series surfactants); alkyl sulfates, alkyl ether sulfates and alkyl aryl ether sulfates (such as the WITCOLATE series surfactants); alkyl sulfonates, alkyl ether sulfonates and alkyl aryl ether sulfonates (such as the WITCONATE series surfactants); alkoxylated phosphate esters and diesters (such as the PHOSPHOLAN series surfactants); alkyl polysaccharides (such as the AGRIMUL PG series surfactants); alkoxylated alcohols (such as the BRIJ or HETOXOL series surfactants); and mixtures thereof.

Anti-packing agents facilitate redispersion of microcapsules upon agitation of a composition in which the microcapsules have settled. A microcrystalline cellulose material such as LATTICE from FMC is effective as an anti-packing agent. Other suitable anti-packing agents are, for example, clay, silicon dioxide, insoluble starch particles, and insoluble metal oxides (e.g. aluminum oxide or iron oxide). Anti-packing agents which change the pH of the dispersion are preferably avoided, for at least some embodiments.

Drift control agents suitable for the practice of the present invention are known to those skilled in the art and include GARDIAN, GARDIAN PLUS, DRI-GARD, and PRO-ONE XL available from Van Diest Supply Co.; COMPA-DRE, available from Loveland Products, Inc.; BRONC MAX EDT, BRONC PLUS DRY EDT, EDT CONCENTRATE, and IN-PLACE available from Wilbur-Ellis Company; STRIKE ZONE DF available from Helena Chemical Co.; INTACT and INTACT XTRA available from Precision Laboratories, LLC; and AGRHO DR 2000 and AGRHO DEP 775 available from the Solvay Group. Suitable drift control agents include, for example, guar-based (e.g., containing guar gum or derivatized guar gum) drift control agents. Various drift control products may also contain one or more water conditioning agent in combination with the drift control agent(s).

Other useful additives include, for example, biocides or preservatives (e.g., PROXEL, commercially available from Avecia), antifreeze agents (such as glycerol, sorbitol, or urea), and antifoam agents (such as Antifoam SE23 from Wacker Silicones Corp.).

The herbicidal compositions described herein can further comprise can further comprise a safener as described herein in the liquid medium of the compositions (i.e., unencapsulated).

II. Herbicidal Compositions Containing an Auxin Herbicide

The present invention also relates to aqueous herbicidal concentrate compositions having a high loading of an auxin herbicide that can exhibit reduced auxin herbicide volatility even at relatively low formulation pH. It has been reported that auxin volatility generally decreases as composition pH increases. Although increasing formulation pH would be one means of controlling the concentration of hydrogen ions, in some instances, it is useful to formulate compositions at low formulation pH (e.g., for compositions that exhibit improved chemical stability at low formulation pH). Accordingly, various aqueous herbicidal concentrate compositions of the present invention comprise an auxin herbicide component comprising an anion of an auxin herbicide and a salt-forming cation, wherein the auxin herbicide concentration in the composition on an acid equivalent basis is at least about 5 wt. %, or at least about 10 wt. %; and a volatility control additive comprising a monocarboxylic acid and/or salt thereof, wherein the herbicidal concentrate composition has a pH that is no greater than about 4.5, no greater than about 4.0, no greater than about 3.8, no greater than about 3.5, or no greater than about 3.3 and/or has a molar ratio of the salt-forming cation to the anion of the auxin herbicide that is no greater than about 0.8:1, no greater than about 0.75:1, no greater than about 0.7:1, no greater than about 0.65:1, no greater than about 0.6:1, no greater than about 0.55:1, no greater than about 0.5:1, no greater than about 0.45:1, no greater than about 0.4:1, no greater than about 0.35:1, no greater than about 0.3:1, no greater than about 0.25:1, or no greater than about 0.2:1.

As noted, these herbicidal concentrate compositions can have a pH that is no greater than about 4.5, no greater than about 4.0, no greater than about 3.8, no greater than about 3.5, or no greater than about 3.3. In some embodiments, the auxin herbicide in these concentrate compositions is not fully neutralized, but only partially neutralized with base. As noted, the molar ratio of salt-forming cation to auxin herbicide anion can be no greater than about 0.8:1, no greater than about 0.75:1, no greater than about 0.7:1, no greater than about 0.65:1, no greater than about 0.6:1, no greater than about 0.55:1, no greater than about 0.5:1, no greater than about 0.45:1, no greater than about 0.4:1, no greater than about 0.35:1, no greater than about 0.3:1, no greater than about 0.25:1, or no greater than about 0.2:1. In various embodiments, the molar ratio of salt-forming cation to auxin herbicide anion is from about 0.2:1 to about 0.8:1, from about 0.2:1 to about 0.75:1, from about 0.2:1 to about 0.7:1, from about 0.2:1 to about 0.65:1, from about 0.2:1 to about 0.6:1, from about 0.2:1 to about 0.55:1, from about 0.2:1 to about 0.5:1, from about 0.2:1 to about 0.45:1, from about 0.2:1 to about 0.4:1, from about 0.2:1 to about 0.35:1, from about 0.2:1 to about 0.3:1, from about 0.3:1 to about 0.8:1, from about 0.3:1 to about 0.75:1, from about 0.3:1 to about 0.7:1, from about 0.3:1 to about 0.65:1, from about 0.3:1 to about 0.6:1, from about 0.3:1 to about 0.55:1, from about 0.3:1 to about 0.5:1, from about 0.3:1 to about 0.45:1, from about 0.3:1 to about 0.4:1, from about 0.4:1 to about 0.8:1, from about 0.4:1 to about 0.75:1, from about 0.4:1 to about 0.7:1, from about 0.4:1 to about 0.65:1, from about 0.4:1 to about 0.6:1, from about 0.4:1 to about 0.55:1, from about 0.4:1 to about 0.5:1, from about 0.5:1 to about 0.9:1, from about 0.5:1 to about 0.8:1, from about 0.5:1 to about 0.75:1, from about 0.5:1 to about 0.7:1, from about 0.5:1 to about 0.65:1, from about 0.6:1 to about 0.9:1, from about 0.6:1 to about 0.8:1, from about 0.6:1 to about 0.75:1, from about 0.6:1 to about 0.7:1, or from about 0.6:1 to about 0.65:1.

The volatility control additive can include any of the volatility control additives described herein (e.g., acetic acid, formic acid and/or salts thereof).

Typically, the acid equivalent molar ratio of the volatility control additive to the auxin herbicide component is at least about 1:10, at least about 1:5, at least about 1:3, at least about 1:2, at least about 1:1, at least about 2:1, at least about 3:1, at least about 4:1, at least about 5:1, at least about 6:1, at least about 8:1, or at least about 10:1. For example, the volatility control additive to the auxin herbicide component can be from about 10:1 to about 1:10, from about 10:1 to about 1:5, from about 5:1 to about 1:5, from about 3:1 to about 1:3, from about 2:1 to about 1:2, from about 1:1 to about 10:1, from about 1:1 to about 8:1, from about 1:1 to about 6:1, from about 1:1 to about 5:1, from about 1:1 to about 4:1, from about 1:1 to about 3:1, or from about 1:1 to about 2:1.

In various herbicidal concentrate compositions, the concentration of the volatility control additive is at least about 3 wt. %, at least about 5 wt. %, at least about 10 wt. %, at least about 12.5 wt. %, or at least about 15 wt. % on acid equivalent basis. For example, the concentration of the volatility control additive can be from about 3 wt. % to about 30 wt. %, from about 3 wt. % to about 25 wt. %, from about 3 wt. % to about 20 wt. %, from about 4 wt. % to about 20 wt. %, from about 5 wt. % to about 20 wt. %, from about 7 wt. % to about 20 wt. %, from about 8 wt. % to about 20 wt. %, from about 9 wt. % to about 20 wt. %, from about 10 wt. % to about 20 wt. %, or from about 10 wt. % to about 15 wt. % on acid equivalent basis.

In various embodiments, the auxin herbicide concentration of these herbicidal concentrates on an acid equivalent basis is at least about 15 wt. %, at least about 20 wt. %, at least about 25 wt. %, at least about 30 wt. %, at least about 35 wt. %, at least about 40 wt. %, at least about 45 wt. %, or at least about 50 wt. %. For example, the auxin herbicide concentration on an acid equivalent basis can be from about 5 wt. % to about 60 wt. %, from about 10 wt. % to about 60 wt. %, from about 20 wt. % to about 60 wt. %, from about 5 wt. % to about 50 wt. %, from about 10 wt. % to about 50 wt. %, from about 20 wt. % to about 50 wt. %, from about 5 wt. % to about 40 wt. %, from about 10 wt. % to about 40 wt. %, or from about 20 wt. % to about 40 wt. %.

The auxin herbicide can comprise one or more of those described herein. For example, the auxin herbicide can be selected from the group consisting of dicamba; 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy) butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; and mixtures thereof. In some embodiments, the auxin herbicide comprises dicamba. In certain embodiments, the auxin herbicide comprises 2,4-D.

The salt-forming cation can also comprise one or more of those described herein for the weak acid, ionic pesticide. For example, the salt-forming cation can comprise a cation of an amine, an alkali metal, or mixture thereof. In various embodiments, the salt-forming cation comprises a cation of an amine selected from the group consisting of ammonia, monoethanolamine, diethanolamine, triethanolamine, dimethylamine, diglycolamine, isopropylamine, and mixtures thereof. In these and other embodiments, the salt-forming cation comprises a cation of an alkali metal selected from the group consisting of sodium, potassium, and mixtures thereof.

The herbicide composition can further include any of the features as described herein such as additional herbicides and other additives.

III. Methods of Use

The present invention is also directed to various methods of using the herbicidal compositions as described herein. Various methods are directed to controlling weeds in a field (e.g., a field of crop plants) comprising applying to the field an application mixture prepared from the aqueous herbicidal concentrate compositions as described herein. For example, the application mixture can be prepared from the aqueous herbicidal concentrate compositions as described herein by diluting the compositions with water.

The application mixture may be applied to a field according to practices known to those skilled in the art and are preferably applied to an agricultural field within a selected timeframe of crop plant development. In various embodiments, the application mixture is applied to the soil, before planting the crop plants or after planting, but pre-emergence to the crop plants. In these and other embodiments, the application mixture is applied to a field from 1-40 days prior to planting of the crop plant and/or pre-emergence (i.e., from planting of the crop plant up to, but not including, emergence or cracking) in order to provide control of newly emerging monocots and small seeded dicot species. In other embodiments of the present invention, the application mixture is applied post-emergence to the crop plants. In various embodiments, the application mixture is applied pre-emergence to the weeds. In other embodiments, the application mixture is applied post-emergence to the weeds.

As used herein, "prior to planting of the crop plant" refers, for example, to a time period of from about 40 days prior to planting of the crop plant to immediately before planting of the crop plant, from about 35 days prior to planting of the crop plant to immediately before planting of the crop plant, from about 30 days prior to planting of the crop plant to immediately before planting of the crop plant, from about 25 days prior to planting of the crop plant to immediately before planting of the crop plant, from about 20 days prior to planting of the crop plant to immediately before planting of the crop plant, from about 15 days prior to planting of the crop plant to immediately before planting of the crop plant, from about 10 days prior to planting of the crop plant to immediately before planting of the crop plant, or from about 5 days prior to planting of the crop plant to immediately before planting of the crop plant. For purposes of the present invention, post-emergence to crop plants includes initial emergence from the soil, i.e., "at cracking."

The effective amount (use rate) of microencapsulated acetamide herbicide, auxin herbicide, and any optional additional herbicide to be applied to an agricultural field is dependent upon the identity of the herbicides, the release rate of the microcapsules, the crop to be treated, and environmental conditions, especially soil type and moisture. Generally, use rates of acetamide herbicides, such as acetochlor, are on the order of at least about 100 g/ha (grams of active ingredient per hectare), at least about 250 g/ha, at least about 500 g/ha, or at least about 1000 g/ha. For example, the use rate of acetamide herbicides can ranges from about 100 g/ha (grams active ingredient per hectare) to about 5000 g/ha, from about 250 g/ha to about 5000 g/ha, from about 500 g/ha to about 5000 g/ha, from about 1000 g/ha to about 5000 g/ha, from about 100 g/ha to about 3000 g/ha, from about 250 g/ha to about 5000 g/ha, from about 500 g/ha to about 3000 g/ha, from about 1000 g/ha to about 3000 g/ha, from about 100 g/ha to about 2000 g/ha, from about 250 g/ha to about 2000 g/ha, from about 500 g/ha to about 2000 g/ha, from about 1000 g/ha to about 2000 g/ha, or from about 1200 g/ha to about 2000 g/ha.

Generally, use rates of auxin herbicides, such as dicamba, are on the order of at least about 50 g/ha (grams acid equivalent per hectare), at least about 100 g/ha, at least about 250 g/ha, at least about 500 g/ha, at least about 1000 g/ha, at least about 1500 g/ha, at least about 2000 g/ha, at least about 2500 g/ha, or at least about 3000 g/ha, or ranges thereof, such as from about 100 g/ha to about 5000 g/ha, from about 500 g/ha to about 2500 g/ha, from about 500 g/ha to about 2000 g/ha, from about 100 g/ha to about 1000 g/ha, from about 250 g/ha to about 1000 g/ha, or from about 250 g/ha to about 900 g/ha. As used herein, the term "acid equivalent" or "a.e." refers to the amount of herbicide present without taking into account the weight of the counter-ion of the salt species if present.

Application mixtures are useful for controlling a wide variety of weeds, i.e., plants that are considered to be a nuisance or a competitor of commercially important crop plants, such as corn, soybean, wheat, barley, cotton, dry beans, snap beans, and potatoes etc. Examples of weeds that may be controlled according to the method of the present invention include, but are not limited to, Velvetleaf (*Abutilon theophrasti*), Proso Millet (*Panicum miliaceum*), Waterhemp (*Amaranthus tuberculatus*); Redroot Pigweed (*Amaranthus retroflexus*) and other weed species within the *Amaranthus* genus; Green Foxtail (*Setaria viridis*), *Setaria lutescens* and other *Setaria* spp., Morning Glory (*Ipomoea* spp.), Goosegrass (*Eleusine indica*); Meadow Foxtail (*Alopecurus pratensis*) and other weed species with the *Alopecurus* genus, Common Barnyard Grass (*Echinochloa crusgalli*) and other weed species within the *Echinochloa* genus, crabgrasses within the genus *Digitaria*, White Clover (*Trifolium repens*), Lambsquarters (*Chenopodium berlandieri*), Common Purslane (*Portulaca oleracea*) and other weed species in the *Portulaca* genus, *Chenopodium album* and other *Chenopodium* spp., *Sesbania exalata* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., and *Conyza Canadensis* and other *Conyza* spp.

In some embodiments, the weeds comprise one or more glyphosate-resistant species, 2,4-D-resistant species, dicamba-resistant species and/or ALS inhibitor herbicide-resistant species. In some embodiments, the glyphosate-resistant weed species is selected from the group consisting of *Amaranthus palmeri, Amaranthus rudis, Ambrosia artemisiifolia, Ambrosia trifida, Conyza bonariensis, Conyza canadensis, Digitaria insularis, Echinochloa colona, Eleusine indica, Euphorbia heterophylla, Lolium multiflorum, Lolium rigidum, Plantago lancelata, Sorghum halepense*, and *Urochloa panicoides*.

In some embodiments of the present invention, crop plants include, for example, corn, soybean, cotton, dry beans, snap beans, and potatoes. Particularly preferred crop species are corn, cotton, wheat, barley, and soybean. Crop plants include hybrids, inbreds, and transgenic or genetically modified plants having specific traits or combinations of traits including, without limitation, herbicide tolerance (e.g., resistance to glyphosate, glufosinate, dicamba, sethoxydim, PPO inhibitor, etc.), *Bacillus thuringiensis* (Bt), high oil, high lysine, high starch, nutritional density, and drought resistance. In some embodiments, the crop plants are tolerant to organophosphorus herbicides, acetolactate synthase (ALS) or acetohydroxy acid synthase (AHAS) inhibitor herbicides, auxin herbicides and/or acetyl CoA carboxylase (ACCase) inhibitor herbicides, In other embodiments the crop plants are tolerant to glyphosate, dicamba, 2,4-D, MCPA, quizalofop, glufosinate, metribuzin and/or diclofop-methyl. In other embodiments, the crop plant is glyphosate and/or dicamba tolerant. In some embodiments of the present invention, crop plants are glyphosate and/or glufosinate tolerant. In further embodiments, the crop plants are glyphosate, glufosinate and dicamba tolerant. In these and other embodiments, the crop plants are tolerant to PPO inhibitors.

Although various methods discussed herein reference applying an application mixture to "a field of crop plants," it is understood that these methods can include applying the mixture to fields that are to be planted with crop plants (e.g., for pre-plant application or burndown in fallow fields). Further, even though various methods reference weeds in a "field," this term is inclusive of smaller, discrete areas, such as a pot of soil or raised bed (e.g., in a greenhouse setting).

Having described the invention in detail, it will be apparent that modifications and variations are possible without departing from the scope of the invention defined in the appended claims.

EXAMPLES

The following non-limiting examples are provided to further illustrate the present invention. The composition numbers used throughout the examples indicate corresponding compositions or dilutions thereof when repeated.

Example 1

General Procedure for Preparation of Microencapsulated Acetochlor

The process of microencapsulation is conducted using an interfacial polycondensation technique. Generally, this technique involves preparing an oil or discontinuous phase liquid containing the herbicide to be encapsulated, the first reactive monomeric/polymeric material(s) (e.g., polyisocyanate), and any additional components to be encapsulated, such as solvents. Acetochlor, ISOPAR M (a $C_{11}$-$C_{16}$ isoalkane solvent), and the polyisocyanate, a blend containing 85 wt. % of DESMODUR N3200 (trimer of hexamethylene 1,6-diisocyanate) and 15 wt. % of DESMODUR W (4,4'-diisocyanatodicyclohexyl methane), were charged to a mixing vessel. The solution was agitated to obtain a homogenous solution.

The interfacial polycondensation technique also requires preparation of an aqueous or continuous phase liquid containing, among other components, the second reactive monomeric or polymeric material (e.g., polyamine). A mixing vessel was charged with water, glycerin, ammonium caseinate, citric acid, an emulsifier (e.g., REAX 105M, sodium lignosulfonate) and any remaining external phase components as noted herein (e.g., urea) except for triethylenetetramine (TETA). The solution was agitated to obtain a clear homogenous solution. The solution may be sealed within the mixing vessel and stored until needed. Prior to use, the mixture was heated to 45° C. in an oven.

Following preparation of the discontinuous phase and the continuous phase liquids, an interfacial polymerization medium was prepared by first charging the continuous phase liquid (without the polyamine) to a Waring blender cup that has been preheated to 45° C. The commercial Waring blender (Waring Products Division, Dynamics Corporation of America, New Hartford, Conn., Blender 700) was powered through a 0 to 120 volt variable autotransformer. The blender mix speed was varied by controlling power to the blender. The discontinuous phase liquid was then added to the continuous phase liquid over a brief interval and blending was continued to obtain an emulsion.

To initiate polymerization of the polyisocyanate (formation of the polyurea shell wall) and encapsulation of the discontinuous phase liquid, TETA (the polyamine) was added to the emulsion over a period of about 5 seconds. The blender speed was then reduced to a speed which just produces a vortex for approximately five to fifteen minutes. The emulsion was then transferred to a hot plate and stirred. The reaction vessel was covered and maintained at about 45° C. for approximately two hours which has been found is sufficient time for the isocyanate to react essentially completely.

The microcapsule slurry is then allowed to cool to close to room temperature. The microcapsules of acetochlor were then mixed with stabilizer components including (except as otherwise noted) KELZAN CC (xanthan gum), INVALON DAM (naphthalene sulfonate condensate), AGNIQUE DFM-111S (silicone based defoamer), PROXEL GXL (solution of 1,2-benzisothiazolin-3-one), caustic (NaOH), mono- or disodium phosphate, glycerin, and urea to form an aqueous dispersion of the microcapsules. The stabilizer components with the exception of the caustic were premixed with a high speed mixer (Waring Blender or Cowles Dissolver). The resulting stabilizer premix is then added to the capsule slurry to stabilize the dispersion of microcapsules. Finally, if any, caustic is added and the mixture is stirred for at least 15 minutes until visually homogeneous.

Example 2

Preparation of Concentrates of Microencapsulated Acetochlor and Dicamba

A series of herbicidal concentrates containing microencapsulated acetochlor and sodium dicamba were prepared. Dicamba salt concentrates were prepared by mixing water with the respective dicamba salt. The microencapsulated acetochlor was prepared in accordance with Example 1. Table 1 lists the ingredients (wt. %) for each concentrate composition including the components used to form the microcapsules and the stabilizer components.

The microencapsulated acetochlor was prepared with polyisocyanate and polyamine components at an equimolar ratio of amine molar equivalents to isocyanate molar equivalents. A volatility control additive (acetic acid) was added to the compositions.

TABLE 1

| | Formulation No. | | | | | | |
|---|---|---|---|---|---|---|---|
| Ingredient | 705 | 706 | 707 | 708 | 710 | 712 | 713 |
| Acetochlor | 26.40 | 26.40 | 26.40 | 26.40 | 26.40 | 26.40 | 26.40 |
| Na Dicamba | 11.86 | 11.86 | 11.86 | 11.86 | 11.86 | 11.86 | 11.86 |
| Na formate (99%) | 4.40 | 3.96 | 3.50 | 3.85 | 3.61 | 4.10 | 3.73 |
| Formic acid | 3.05 | 2.86 | 3.17 | 3.41 | 2.60 | 3.26 | 3.01 |
| Isopar M | 2.38 | 2.38 | 2.38 | 2.38 | 2.38 | 2.38 | 2.38 |
| DESMODUR N3200/ DESMODUR W | 3.35 | 3.35 | 3.35 | 3.35 | 3.35 | 3.35 | 3.35 |
| REAX 105M (25%) | 6.43 | 6.43 | 6.43 | 6.43 | 6.43 | 6.43 | 6.43 |
| Glycerin | 1.42 | 1.42 | 1.42 | 1.42 | 1.42 | 1.42 | 1.42 |
| Ammonium Caseinate | 0.09 | 0.09 | 0.09 | 0.09 | 0.09 | 0.09 | 0.09 |

TABLE 1-continued

| | Formulation No. | | | | | | |
|---|---|---|---|---|---|---|---|
| Ingredient | 705 | 706 | 707 | 708 | 710 | 712 | 713 |
| TETA | 1.42 | 1.42 | 1.42 | 1.42 | 1.42 | 1.42 | 1.42 |
| Invalon DAM | 3.43 | 3.43 | 3.43 | 3.43 | 3.43 | 3.43 | 3.43 |
| Urea (50%) | 2.00 | 2.00 | 2.00 | 2.00 | 2.00 | 2.00 | 2.00 |
| Kelzan CC | 0.07 | 0.07 | 0.07 | 0.07 | 0.07 | 0.07 | 0.07 |
| Aerodisp W7520N | 1.60 | 1.60 | 1.60 | 1.60 | 1.60 | 1.60 | 1.60 |
| Agnique DFM-111S | 0.10 | 0.10 | 0.10 | 0.10 | 0.10 | 0.10 | 0.10 |
| Proxel GXL | 0.06 | 0.06 | 0.06 | 0.06 | 0.06 | 0.06 | 0.06 |
| Disodium phosphate | 0.87 | 0.87 | 0.87 | 0.87 | 0.87 | 0.87 | 0.87 |
| water | 31.07 | 31.71 | 31.85 | 31.26 | 32.31 | 31.16 | 31.78 |

Example 3

Preparation of Concentrates of Microencapsulated Acetochlor and Dicamba

A series of herbicidal concentrate compositions containing microencapsulated acetochlor and sodium dicamba were prepared. Concentrates of partially neutralized dicamba were initially prepared by mixing dicamba acid and sodium hydroxide in solution at a molar ratio sufficient to achieve the percentage of neutralization desired. The microencapsulated acetochlor was prepared in accordance with Example 1. The concentrate compositions containing microencapsulated acetochlor and dicamba were prepared by mixing the dicamba concentrate with the microencapsulated acetochlor. If needed, acid (sulfuric and/or phosphoric acid) was added as to adjust the pH to the desired value. Table 2 lists the ingredients for each concentrate composition.

The microencapsulated acetochlor was prepared with polyisocyanate and polyamine components at an equimolar ratio of amine molar equivalents to isocyanate molar equivalents. A volatility control additive (acetic acid) was added to the compositions. One composition also contained ferric sulfate.

TABLE 2

| | Composition No. | | | | | | | | |
|---|---|---|---|---|---|---|---|---|---|
| Ingredient | 564 | 566 | 568 | 569 | 573 | 574 | 577 | 580 | 581 |
| 44% microencapsulated acetochlor (g) | 25.56 | 25.61 | 27.68 | 27.63 | 27.55 | 27.65 | 27.62 | 30.06 | 26.08 |
| 32.54% a.e. (50% neutralized) Na dicamba | 13.36 | 13.37 | — | — | — | — | — | — | — |
| 38% a.e. (90% neutralized) Na dicamba (g) | — | — | — | — | — | — | 14.23 | — | — |
| 40% a.e. (50% neutralized) Na dicamba (g) | — | — | 13.52 | 13.51 | 13.50 | 13.46 | — | — | — |
| 50% a.e. (50% neutralized) Na dicamba (g) | — | — | — | — | — | — | — | 13.00 | 11.33 |
| 50% acetic acid (g) | 4.85 | 3.02 | 4.08 | 2.20 | 4.41 | 4.58 | — | — | — |
| 80% acetic acid (g) | — | — | — | — | — | — | — | 4.04 | 2.60 |
| ferric sulfate (g) | — | — | — | 0.40 | — | — | — | — | — |
| 10% $H_2SO_4$ (g) | — | 1.8 | 1.38 | 2.04 | — | — | — | — | — |
| 20% $H_2SO_4$ (g) | — | — | — | — | 2.81 | 2.09 | — | — | — |
| 42.5% phosphoric acid | — | — | — | — | — | 2.27 | 4.04 | — | 0.92 |
| Aerodisp W7520 N (g) | — | — | — | — | — | — | — | 0.63 | 0.81 |
| 2.5% Kelzan gel (g) | 1.00 | 1.12 | 0.76 | 0.73 | 0.69 | 0.78 | 0.80 | 0.78 | 0.80 |
| Proxel (g) | 0.06 | 0.06 | 0.06 | 0.06 | 0.06 | 0.06 | 0.06 | 0.10 | 0.06 |
| water (g) | 1.16 | — | — | — | — | — | — | 2.90 | 0.98 |

These concentrate compositions were tested for chemical stability by incubating samples at various temperatures and time periods as indicated on Table 3. The weight % recovery of dicamba and acetochlor after the testing period was used as a measure of chemical stability. The results show that greater chemical stability is typically exhibited at relatively lower pH. The emulsifier used in preparation of the microencapsulated acetochlor was REAX 105M, a sodium lignosulfonate. This emulsifier was stable even at low formulation pH.

TABLE 3

| | | 54° C. for 2 weeks | | 54° C. for 1 week | | 40° C. for 8 weeks | | 40° C. for 4 weeks | |
|---|---|---|---|---|---|---|---|---|---|
| Comp. No. | pH | Dicamba loss (%) | Acetochlor loss (%) | Dicamba loss (%) | Acetochlor loss (%) | Dicamba loss (%) | Acetochlor loss (%) | Dicamba loss (%) | Acetochlor loss (%) |
| 564 | 4.1 | 4.64 | 2.51 | 2.76 | 1.10 | — | — | 2.27 | 0.76 |
| 566 | 3.9 | 4.56 | 1.78 | 2.75 | 0.99 | — | — | 2.44 | 0.91 |
| 568 | 4.0 | 4.40 | 2.57 | 2.73 | 1.14 | 4.87 | 1.11 | 1.86 | 0.94 |
| 569 | 3.9 | 5.10 | 2.77 | 2.81 | 1.38 | 4.13 | 1.30 | — | — |
| 573 | 3.0 | 2.16 | 1.32 | 0.95 | 0.36 | 1.32 | 2.07 | 0.78 | 0.72 |
| 574 | 2.4 | 1.52 | 1.32 | 0.45 | 0.25 | 1.32 | 1.16 | 0.36 | 0.45 |
| 577 | 3.6 | 4.64 | 2.51 | 1.98 | 0.96 | — | — | 1.32 | 0.50 |
| 580 | 4.2 | 3.80 | 1.96 | — | — | 2.56 | 0.62 | — | — |
| 581 | 4.0 | 3.77 | 2.23 | — | — | 2.40 | 0.82 | — | — |

*—* indicates that the test was not performed.

Example 4

Preparation of Concentrates of Microencapsulated Acetochlor and Dicamba

A series of herbicidal concentrate compositions containing microencapsulated acetochlor and sodium dicamba were prepared. Concentrates of partially neutralized dicamba were initially prepared by mixing dicamba acid and sodium hydroxide in solution at a molar ratio sufficient to achieve the percentage of neutralization desired. The microencapsulated acetochlor was prepared in accordance with Example 1. The concentrate compositions containing microencapsulated acetochlor and dicamba were prepared by mixing the dicamba concentrate with the microencapsulated acetochlor. Tables 4 and 5 list the ingredients for each concentrate composition.

The microencapsulated acetochlor was prepared with polyisocyanate and polyamine components at an equimolar ratio of amine molar equivalents to isocyanate molar equivalents. A volatility control additive (sodium formate/formic acid) was added to the compositions. If needed, base (sodium hydroxide) was added as to adjust the pH to the desired value.

TABLE 4

| | Composition No. | | | | | | |
|---|---|---|---|---|---|---|---|
| Ingredient | 608 | 625 | 627 | 629 | 633 | 674 | 675 |
| 44% microencapsulated acetochlor (g) | 30.01 | 60.00 | 60.02 | 60.00 | 60.05 | 60.02 | 63.90 |
| 50% a.e. (50% neutralized) Na dicamba (g) | 11.70 | 23.40 | 23.4 | 23.40 | 23.40 | 23.38 | 24.90 |
| 99% Na formate (g) | — | — | 3.64 | 3.93 | 2.77 | 4.17 | 4.42 |
| 50% formic acid (g) | 4.51 | 9.02 | 3.56 | 6.66 | 5.31 | 5.43 | 5.78 |
| 50% NaOH (g) | 1.70 | 3.26 | — | 0.56 | — | | |
| 2.5% Kelzan gel (g) | — | 1.49 | 1.03 | 1.20 | 1.15 | 1.98 | 1.60 |
| Aerodisp W7520 N (fumed silica) (g) | — | 1.46 | 1.06 | 1.63 | 1.20 | 1.21 | 1.28 |
| Proxel (g) | 0.06 | 0.06 | — | 0.06 | 0.06 | 0.06 | 0.10 |
| Water (g) | 2.30 | 1.45 | 0.06 | 2.63 | 6.10 | 0.04 | 0.05 |

TABLE 5

| Ingredient | NF08-2 | NF09-2 | NF10-2 | NF11-2 | NF 12-2 |
|---|---|---|---|---|---|
| 44% microencapsulated acetochlor (g) | 60.01 | 60.0 | 60.0 | 60.0 | 60.0 |
| 50% a.e. (50% neutralized) Na dicamba (g) | 23.48 | 23.40 | 23.40 | 23.40 | 23.46 |
| 99% Na formate (g) | 3.68 | 3.56 | 3.93 | 3.44 | 3.20 |
| 50% formic acid (g) | 5.13 | 5.39 | 5.00 | 4.57 | 4.71 |
| 2.5% Kelzan gel (g) | 1.61 | 1.62 | 1.61 | 1.64 | 1.77 |
| Aerodisp W7520 N (g) | 1.60 | 1.60 | 1.60 | 1.60 | 1.61 |
| Antifoam DFM-111S (g) | 0.02 | 0.02 | 0.02 | 0.02 | 0.02 |
| Proxel (g) | 0.03 | 0.03 | 0.03 | 0.03 | 0.03 |
| Water (g) | 4.58 | 4.52 | 4.59 | 5.36 | 5.32 |

These concentrate compositions were tested for chemical stability by incubating samples at various temperatures and time periods as indicated on Table 6. The weight % recovery of dicamba and acetochlor after the testing period was used as a measure of chemical stability. The emulsifier used in preparation of the microencapsulated acetochlor was REAX 105M, a sodium lignosulfonate. This emulsifier was stable even at low formulation pH.

TABLE 6

| Comp. No. | pH | Formic Acid wt. % | 54° C. for 2 weeks | | 40° C. for 4 weeks | | 35° C. for 6 weeks | |
|---|---|---|---|---|---|---|---|---|
| | | | Dicamba loss (%) | Acetochlor loss (%) | Dicamba loss (%) | Acetochlor loss (%) | Dicamba loss (%) | Acetochlor loss (%) |
| 608 | 3.8 | | 4.84 | 2.74 | — | — | — | — |
| 625 | 3.8 | 4.5 | 4.77 | 2.40 | — | — | — | — |
| 627 | 4.1 | 4.2 | 6.47 | 3.06 | — | — | — | — |
| 629 | 3.9 | 6.0 | 5.46 | 2.84 | — | — | 1.96 | 1.03 |
| 633 | 3.9 | 4.5 | 4.92 | 2.06 | — | — | — | — |
| 674 | 4.0 | 5.5 | 6.02 | 3.16 | — | — | — | — |
| 675 | 4.0 | 5.85 | 6.10 | 3.34 | — | — | — | — |
| NF08-2 | 3.9 | 5.0 | 5.42 | 2.76 | 2.18 | 0.98 | — | — |
| NF09-2 | 3.9 | 5.0 | 5.19 | 2.53 | 2.09 | 0.86 | — | — |
| NF10-2 | 3.9 | 5.0 | 5.50 | 2.64 | 1.76 | 0.83 | — | — |
| NF11-2 | 3.9 | 4.5 | 5.64 | 2.82 | 2.26 | 1.09 | — | — |
| NF12-2 | 3.9 | 4.5 | 5.25 | 2.66 | 2.0 | 0.90 | — | — |

*—* indicates that the test was not performed.

Example 5

Preparation of Concentrates of Microencapsulated Acetochlor and Dicamba

A series of herbicidal concentrate compositions containing microencapsulated acetochlor and sodium dicamba were prepared. Concentrates of partially neutralized dicamba were initially prepared by mixing dicamba acid and sodium hydroxide in solution at a molar ratio sufficient to achieve the percentage of neutralization desired. The microencapsulated acetochlor was prepared in accordance with Example 1. The concentrate compositions containing microencapsulated acetochlor and dicamba were prepared by mixing the dicamba concentrate with the microencapsulated acetochlor. Table 7 lists the ingredients for each concentrate composition.

The microencapsulated acetochlor was prepared with polyisocyanate and polyamine components at an equimolar ratio of amine molar equivalents to isocyanate molar equivalents. A volatility control additive (sodium formate/formic acid) was added to the compositions.

TABLE 7

| Ingredient | 703 | 705 | 706 | 707 | 708 | 710 | 712 | 713 |
|---|---|---|---|---|---|---|---|---|
| 44% microencapsulated acetochlor (g) | 60.02 | 60.00 | 60.03 | 60.05 | 60.00 | 60.00 | 60.00 | 60.00 |
| 48% a.e. (50% neutralized) Na dicamba (g) | 24.29 | 24.29 | 24.30 | 24.28 | 24.28 | 24.27 | 24.28 | 24.29 |

TABLE 7-continued

| Ingredient | 703 | 705 | 706 | 707 | 708 | 710 | 712 | 713 |
|---|---|---|---|---|---|---|---|---|
| 99% Na formate (g) | 4.02 | 4.04 | 3.96 | 3.50 | 3.85 | 3.61 | 4.10 | 3.73 |
| 50% formic acid (g) | 4.32 | 6.11 | 5.71 | 6.33 | 6.82 | 5.20 | 6.52 | 6.02 |
| 2.5% Kelzan gel (g) | 1.85 | 1.81 | 1.86 | 1.85 | 1.78 | 1.82 | 1.80 | 1.80 |
| Aerodisp W7520 N (fumed silica) (g) | 1.55 | 1.61 | 1.62 | 1.60 | 1.63 | 1.60 | 1.60 | 1.60 |
| Antifoam DFM-111S (g) | 0.06 | 0.08 | 0.06 | 0.08 | 0.08 | 0.07 | 0.08 | 0.08 |
| Proxel (g) | 0.04 | 0.04 | 0.04 | 0.04 | 0.04 | 0.04 | 0.04 | 0.04 |
| water (g) | 3.00 | 1.66 | 2.42 | 2.30 | 1.52 | 3.42 | 1.58 | 2.44 |

These concentrate compositions were tested for chemical stability by incubating samples at various temperatures and time periods as indicated on Table 8. The weight % recovery of dicamba and acetochlor after the testing period was used as a measure of chemical stability. The emulsifier used in preparation of the microencapsulated acetochlor was REAX 105M, a sodium lignosulfonate. This emulsifier was stable even at low formulation pH.

TABLE 8

| | | 54° C. for 2 weeks | |
|---|---|---|---|
| Composition No. | pH | Dicamba loss (%) | Acetochlor loss (%) |
| 703 | 4.1 | 6.09 | 3.43 |
| 705 | 3.9 | 5.15 | 2.57 |
| 706 | 3.9 | 5.06 | 2.82 |
| 707 | 3.8 | 4.05 | 1.86 |
| 708 | 3.8 | 4.06 | 1.91 |
| 710 | 3.9 | 4.66 | 2.31 |
| 712 | 3.9 | 4.57 | 2.24 |
| 713 | 3.9 | 4.70 | 2.74 |

Example 6

Stability Study

A series of comparative herbicidal concentrate compositions containing microencapsulated acetochlor and sodium dicamba were prepared. The comparative herbicidal concentrate compositions are presented in Table 9. SOKALAN (BASF), a maleic acid-olefin copolymer, was used as the emulsifier in these compositions. The pH and the ratio of amine molar equivalents to isocyanate molar equivalents is indicated on the table.

The herbicidal concentrate compositions presented in Table 9 were subjected to stability testing at 54° C. for 1 week. The stability of concentrate composition 573, as described in Example 3, was compared to the stability concentrates described in Table 9. Table 10 presents the results of the stability tests.

TABLE 9

| | Composition No. | | | |
|---|---|---|---|---|
| Ingredient | A | B | C | D |
| 44% microencapsulated acetochlor (g) | 60.0 | 60.0 | 60.0 | 27.61 |
| 35% a.e. (100% neutralized) Na dicamba (g) | 33.42 | 33.42 | — | — |
| 38% a.e. (90% neutralized) Na dicamba (g) | — | — | 30.79 | 14.25 |
| Na acetate | 3.33 | 3.33 | 0.5 | — |
| 50% acetic acid (g) | — | — | 4.54 | 5.00 |
| Ferric sulfate (50%) | — | — | — | 0.62 |
| 2.5% Kelzan gel (g) | 1.16 | 1.16 | 1.16 | 0.64 |
| Aerodisp W7520 N (fumed silica) (g) | 1.6 | 1.6 | 1.6 | 1.15 |
| Antifoam DFM-111S (g) | 0.02 | 0.02 | 0.02 | — |
| Proxel (g) | 0.03 | 0.03 | 0.03 | 0.03 |
| water (g) | 0.44 | 1.6 | 2.52 | 1.08 |
| pH | 8.1 | 7.0 | 4.8 | 4.5 |
| Ratio of amine molar equivalents to isocyanate molar equivalents | 1.2:1 | 1:1 | 1:1 | 1:1 |
| Emulsifier | SOKALAN | SOKALAN | SOKALAN | SOKALAN |

TABLE 10

| Composition No. | pH | 54° C. for 1 weeks | |
|---|---|---|---|
| | | Dicamba loss (%) | Acetochlor loss (%) |
| A | 8.1 | 8.0 | 5.0 |
| B | 7.0 | 5.5 | 3.0 |
| C | 4.8 | 4.6 | 2.0 |
| D | 4.5 | 3.0 | 2.0 |
| 573 | 3.0 | 2.2 | 1.3 |

Example 7

Volatility Study

Selected concentrate compositions prepared in accordance with the preceding Examples were diluted with water to a dicamba concentration of 1.2 wt. %. Roundup Power-Max (potassium glyphosate) was tank mixed with the diluted concentratres. The diluted compositions were subjected to dicamba volatility testing by the procedure described in "A Method to Determine the Relative Volatility of Auxin Herbicide Formulations" in ASTM publication STP1587 entitled "Pesticide Formulation and Delivery Systems: 35th Volume, Pesticide Formulations, Adjuvants, and Spray Characterization in 2014, published 2016, which is incorporated herein by reference. The general procedure is described briefly below.

Humidomes obtained from Hummert International (Part Nos 14-3850-2 for humidomes and 11-3050-1 for 1020 flat tray) were modified by cutting a 2.2 cm diameter hole on one end approximately 5 cm from the top to allow for insertion of a glass air sampling tube (22 mm OD) containing a polyurethane foam (PUF) filter. The sampling tube was secured with a VITON o-ring on each side of the humidome wall. The air sampling tube external to the humidome was fitted with tubing that was connected to a vacuum manifold immediately prior to sampling. The flat tray beneath the humidome was filled with 1 liter of sifted dry or wet 50/50 soil (50% Redi-Earth and 50% US 10 Field Soil) to a depth of about 1 cm. A track sprayer was used to apply the compositions at a dicamba application rate of 1.0 lb/A a.e. at 10 gallons per acre (GPA) onto the soil of each humidome.

The flat tray bottom containing the auxin herbicide formulation on soil was covered with the humidome lid and the lid was secured with clamps. The growth chambers were set at 35° C. and 40% relative humidity (RH). The assembled humidomes were placed in a temperature and humidity controlled environment and connected to a vacuum manifold through the air sampling line. Air was drawn through the humidome and PUF at a rate of 2 liters per minute (LPM) for 24 hours at which point the air sampling was stopped. The humidomes were then removed from the controlled environment and the PUF filter was removed. The PUF filter was extracted with 20 mL of methanol and the solution was analyzed for the auxin herbicide concentration using LC-MS methods known in the art.

The results of the volatility tests are shown in Table 11. The volatility results are compared to tank mixes of XTENDIMAX (sodium dicamba) plus ROUNDUP POWERMAX and CLARITY (diglycolamine dicamba) plus ROUNDUP POWERMAX The results from this study show that the volatility of spray solutions prepared from the test concentrates (629, 705, 706, 708, 710, 712, and 713) exhibited dicamba volatilities similar to that of XTENDIMAX plus ROUNDUP POWERMAX and consistently lower than that of CLARITY plus ROUNDUP POWERMAX.

TABLE 11

| W-D premix formulation | Spray solution | Dicamba in air (ng/L), avg |
|---|---|---|
| 629 | 1.2% a.e. dicamba from Premix # 629 + 2.4% a.e. glyphosate from ROUNDUP POWERMAX | 1.001 |
| 705 | 1.2% a.e. dicamba from Premix # 705 + 2.4% a.e. glyphosate from ROUNDUP POWERMAX | 0.928 |
| 706 | 1.2% a.e. dicamba from Premix # 706 + 2.4% a.e. glyphosate from ROUNDUP POWERMAX | 0.986 |
| 708 | 1.2% a.e. dicamba from Premix # 708 + 2.4% a.e. glyphosate from ROUNDUP POWERMAX | 0.861 |
| 710 | 1.2% a.e. dicamba from Premix # 710 + 2.4% a.e. glyphosate from ROUNDUP POWERMAX | 0.945 |
| 712 | 1.2% a.e. dicamba from Premix # 712 + 2.4% a.e. glyphosate from ROUNDUP POWERMAX | 0.947 |
| 713 | 1.2% a.e. dicamba from Premix # 713 + 2.4% a.e. glyphosate from ROUNDUP POWERMAX | 0.803 |
| XTENDIMAX | 1.2% a.e. dicamba from XTENDIMAX + 2.4% a.e. glyphosate from ROUNDUP POWERMAX | 0.827 |
| CLARITY | 1.2% a.e. dicamba from CLARITY + 2.4% a.e. glyphosate from ROUNDUP POWERMAX | 2.00 |

Example 8

Effect of Multivalent Metal Cations

A series of herbicidal concentrate compositions containing microencapsulated acetochlor, sodium dicamba, and varying amounts of ferric sulfate were prepared. Concentrates of partially neutralized dicamba were initially prepared by mixing dicamba acid and sodium hydroxide in solution at a molar ratio sufficient to achieve the percentage of neutralization desired. The microencapsulated acetochlor was prepared in accordance with Example 1. The concentrate compositions were prepared by combining the microencapsulated acetochlor and ferric sulfate solutions followed by the addition of the dicamba concentrate were prepared by mixing the dicamba concentrate with the microencapsulated acetochlor. Table 12 lists the ingredients for each concentrate composition.

TABLE 12

| | Composition No. | | |
|---|---|---|---|
| Ingredient | 550 | 552 | 553 |
| 44% microencapsulated acetochlor (g) | 25.57 | 25.58 | 25.59 |
| 38% a.e. (90% neutralized) Na dicamba (g) | 13.18 | 13.32 | 13.59 |
| 50% acetic acid (g) | 3.09 | 3.03 | 3.03 |
| Ferric sulfate (50%) | 0.43 | 0.87 | — |
| 2.5% Kelzan gel (g) | 0.90 | 0.94 | 1.06 |
| Aerodisp W7520 N (fumed silica) (g) | 0.83 | 0.98 | 0.81 |
| Antifoam DFM-111S (g) | 0.03 | 0.03 | 0.03 |
| Proxel (g) | 0.06 | 0.06 | 0.06 |
| water (g) | 5.93 | 4.1 | 5.13 |

These concentrate compositions were tested for chemical stability by incubating samples at 54° C. for 1 week. The weight % recovery of dicamba and acetochlor after the testing period was used as a measure of chemical stability and is presented on Table 13. The results show that the concentrate compositions containing ferric sulfate exhibit improved stability.

TABLE 13

| Composition No. | pH | Ferric sulfate content (50% solution) (%) | 54° C. for 1 weeks | |
|---|---|---|---|---|
| | | | Dicamba loss (%) | Acetochlor loss (%) |
| 553 | 4.6 | 0.00 | 3.55 | 1.48 |
| 550 | 4.6 | 0.43 | 3.16 | 1.31 |
| 552 | 4.7 | 0.87 | 3.06 | 1.13 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions, methods and processes without departing from the scope of the invention, it is intended that all matter contained in the above description and shown in the accompanying drawings shall be interpreted as illustrative and not in a limiting sense.

What is claimed is:

1. An aqueous herbicidal concentrate composition comprising:
   (a) microcapsules dispersed in an aqueous liquid medium wherein the microcapsules comprise a core material comprising an acetamide herbicide and a polyurea shell wall encapsulating the core material, wherein the acetamide herbicide concentration in the composition on an active ingredient basis is at least about 10 wt. %, and
   (b) an auxin herbicide component comprising an anion of an auxin herbicide and a salt-forming cation, wherein the auxin herbicide concentration in the composition on an acid equivalent basis is at least about 1 wt. %, and wherein the composition satisfies the following conditions:
   (i) a pH that is no greater than about 3.8;
   (ii) a molar ratio of the salt-forming cation to the anion of the auxin herbicide that is no greater than about 0.8:1; and
   (iii) the composition further comprises an emulsifier comprising an anionic surfactant comprising a strong or mineral acid functionality having a molecular weight of at least about 1,000 Da, wherein the anionic surfactant comprising a strong or mineral acid functionality has a pKa of less than about 4.5; and one or more of the following conditions:
   (iv) the composition further comprises ferric sulfate; and/or
   (v) the composition further comprises an alkylene glycol.

2. The composition of claim 1 wherein the emulsifier comprising an anionic surfactant comprising a strong or mineral acid functionality comprises sodium lignosulfonate.

3. The composition of claim 1 wherein the anionic surfactant comprising a strong or mineral acid functionality has a pKa of less than about 4.

4. The composition of claim 1 wherein the strong or mineral acid functionality is selected from the group consisting of sulfuric acid and phosphoric acid.

5. The composition of claim 1 wherein the emulsifier comprising an anionic surfactant comprising a strong or mineral acid functionality is selected from the group consisting of alkali, alkaline earth and ammonium salts of sulfonates, sulfates, phosphates, and carboxylates.

6. The composition of claim 1 wherein the composition further comprises an alkylene glycol and the alkylene glycol comprises a $C_2$ to $C_{10}$ glycol or a $C_2$ to $C_6$ glycol.

7. The composition of claim 1 wherein the polyurea shell wall is formed in a polymerization medium by a polymerization reaction between a polyisocyanate component comprising a polyisocyanate or mixture of polyisocyanates and a polyamine component comprising a polyamine or mixture of polyamines to form the polyurea and the ratio of amine molar equivalents contained in the polyamine component to isocyanate molar equivalents contained in the polyisocyanate component is at least about 1.1:1.

8. The composition of claim 1 wherein the acetamide herbicide is selected from the group consisting of acetochlor, alachlor, butachlor, butenachlor, carbetamide, delachlor, dethatyl, dimethachlor, dimethenamid, dimethenamid-P, mefenacet, metazochlor, metolachlor, S-metolachlor, napropamide, pretilachlor, pronamide, propachlor, propisochlor, prynachlor, terbuchlor, thenylchlor and xylachlor, salts and esters thereof, and mixtures thereof.

9. The composition of claim 1 wherein the acetamide herbicide comprises acetochlor.

10. The composition of claim 1 wherein the auxin herbicide comprises dicamba.

11. The composition of claim 1 wherein the auxin herbicide comprises 2,4-D.

12. The composition of claim 1 wherein the salt-forming cation comprises a cation of an amine, an alkali metal, or mixture thereof.

13. The composition of claim 1 having a pH that is no greater than about 3.5.

14. The composition of claim 1 wherein the molar ratio of the salt-forming cation to the anion of the auxin herbicide is no greater than about 0.75:1.

15. The composition of claim 1 further comprising a volatility control additive comprising a monocarboxylic acid and/or salt thereof.

16. The composition of claim 15 wherein the volatility control additive comprises a salt of a monocarboxylic acid having the formula $R^1$-C(O)OM, wherein $R^1$ is substituted or unsubstituted $C_1$-$C_{20}$ alkyl, substituted or unsubstituted $C_2$-$C_{20}$ alkenyl, substituted or unsubstituted aryl, and substituted or unsubstituted arylalkyl and M is an agriculturally acceptable cation.

17. The composition of claim 15 wherein the volatility control additive comprises a monocarboxylic acid and/or salt thereof selected from the group consisting of formic acid, acetic acid, propionic acid, benzoic acid, benzoic acid, salts thereof, and combinations thereof.

18. The composition of claim 15 wherein the volatility control additive comprises a monocarboxylic acid and/or salt thereof selected from the group consisting of acetic acid, sodium acetate, potassium acetate, formic acid, sodium formate, potassium formate, and combinations thereof.

19. A method for controlling weeds in a field, the method comprising:
   mixing water with the aqueous herbicidal concentrate composition of claim 1 to form an application mixture; and
   applying the application mixture to the field in a herbicidally effective amount.

* * * * *